US011004150B2

(12) United States Patent
Schonberg

(10) Patent No.: US 11,004,150 B2
(45) Date of Patent: *May 11, 2021

(54) APPARATUSES, METHODS AND SYSTEMS FOR A HIGH DENSITY FINANCIAL ASSET INFORMATION DISPLAY

(71) Applicant: Goldman Sachs & Co. LLC, New York, NY (US)

(72) Inventor: Stephen Richard Schonberg, Tenafly, NJ (US)

(73) Assignee: Goldman Sachs & Co. LLC, New York, NY (US)

( * ) Notice: Subject to any disclaimer, the term of this patent is extended or adjusted under 35 U.S.C. 154(b) by 550 days.

This patent is subject to a terminal disclaimer.

(21) Appl. No.: 15/837,954

(22) Filed: Dec. 11, 2017

(65) Prior Publication Data

US 2018/0101911 A1    Apr. 12, 2018

Related U.S. Application Data

(60) Division of application No. 14/045,676, filed on Oct. 3, 2013, now Pat. No. 9,842,368, which is a continuation of application No. 12/233,175, filed on Sep. 18, 2008, now abandoned.

(60) Provisional application No. 60/973,387, filed on Sep. 18, 2007.

(51) Int. Cl.
*G06Q 40/00* (2012.01)
*G06Q 40/06* (2012.01)

(52) U.S. Cl.
CPC .................................. *G06Q 40/06* (2013.01)

(58) Field of Classification Search
None
See application file for complete search history.

(56) References Cited

U.S. PATENT DOCUMENTS

| 4,840,382 | A  | 6/1989  | Rubin         |
| 5,838,938 | A  | 11/1998 | Morgan        |
| 6,169,534 | B1 | 1/2001  | Raffel et al. |
| 6,453,303 | B1 | 9/2002  | Li            |
| 6,462,758 | B1 | 10/2002 | Price et al.  |

(Continued)

OTHER PUBLICATIONS

StockCharts.com, "Rate of Change (ROC) and Momentum", Nov. 28, 2006, 2 pages. (Year: 2006).*

(Continued)

*Primary Examiner* — Benjamin S Brindley

(57) ABSTRACT

The disclosure details the implementation of an APPARATUSES, METHODS AND SYSTEMS FOR A HIGH DENSITY FINANCIAL ASSET INFORMATION DISPLAY. The disclosure teaches a High Density Financial Asset Information Display which provides a high density, straightforward, unified, compact, dynamic and comprehensive display interface that presents users with a high volume of easy to understand financial asset information including the current buy and sell prices, the current price direction, the amount of time the asset pair is traded at each price, and the change in price over multiple time frames. The High Density Financial Asset Information Display is dynamically updated with the latest financial information and is formatted to convey relevant changes in the information of interest in a way that is easily understood by users.

20 Claims, 29 Drawing Sheets

(56) References Cited

U.S. PATENT DOCUMENTS

| | | | | |
|---|---|---|---|---|
| 7,246,093 | B1* | 7/2007 | Katz | G06Q 40/00 705/37 |
| 7,707,100 | B2 | 4/2010 | Hiartbera et al. | |
| 7,882,006 | B2 | 2/2011 | Gardner et al. | |
| 2002/0059135 | A1 | 5/2002 | Ma et al. | |
| 2002/0184134 | A1 | 12/2002 | Olsen et al. | |
| 2003/0065600 | A1 | 4/2003 | Terashima et al. | |
| 2004/0098271 | A1 | 5/2004 | Hicks et al. | |
| 2004/0128225 | A1* | 7/2004 | Thompson | G06Q 40/04 705/37 |
| 2004/0164961 | A1 | 8/2004 | Bal et al. | |
| 2005/0165670 | A1* | 7/2005 | Woodmansey | G06Q 40/04 705/37 |
| 2005/0261999 | A1 | 11/2005 | Rowady, Jr. | |
| 2005/0262003 | A1* | 11/2005 | Brumfield | G06Q 40/04 705/37 |
| 2006/0036542 | A1 | 2/2006 | McNair | |
| 2007/0005481 | A1 | 1/2007 | Kedia et al. | |
| 2007/0033127 | A1* | 2/2007 | Masuyama | G06Q 40/00 705/36 R |
| 2007/0118454 | A1* | 5/2007 | Bauerschmidt | G06Q 20/381 705/36 R |
| 2007/0156565 | A1* | 7/2007 | Singer | G06F 3/0484 705/37 |
| 2007/0198387 | A1* | 8/2007 | Uenohara | G06Q 40/06 705/36 R |
| 2008/0016009 | A1* | 1/2008 | Hjartberg | G06Q 40/04 705/36 R |
| 2008/0021806 | A1* | 1/2008 | Townsend | G06Q 40/04 705/37 |
| 2008/0243711 | A1* | 10/2008 | Aymeloglu | G06Q 40/06 705/36 R |
| 2009/0043637 | A1* | 2/2009 | Eder | G06N 7/005 705/35 |
| 2009/0063359 | A1 | 3/2009 | Connors | |
| 2009/0076981 | A1 | 3/2009 | Schonberg | |
| 2009/0150279 | A1 | 6/2009 | Hadar | |
| 2009/0216684 | A1 | 8/2009 | Helweg | |
| 2010/0030701 | A1 | 2/2010 | DuBois | |
| 2010/0169206 | A1* | 7/2010 | Singer | G06F 3/0484 705/37 |
| 2011/0040661 | A1 | 2/2011 | Griffin et al. | |
| 2011/0066532 | A1 | 3/2011 | Schonberg et al. | |
| 2014/0136447 | A1 | 5/2014 | Schonberg | |
| 2014/0330701 | A1 | 11/2014 | Townsend et al. | |

OTHER PUBLICATIONS

Dundas, "Dundas Chart For .NET," http://web.archive.org/web/20070315112109/http://www.dundas.com/Products/Chart/NET/index.aspx>, 2 pages, Mar. 15, 2007.

Syncfusion Inc., "Essential Studio v5," http://web.archive.org/web/20070314025543/http:/lwww.syncfusion .com/, 1 page, Mar. 14, 2007.

Spotfire, Inc., "Enterprise Business Intelligence & Analytics Applications," htto://web.archive.ora/web/20070316023002/http://www.sootfire.com, 2 pages, 2006.

Visokio Ltd., "Data Visualization Software For Everyone," http://web.archive.org/web/20070310003028/http://www.visokio.com/, 1 page, 2006.

Microsoft Corporation, "See Windows Vista," http://web.archive.org/web/20070301103356/http://www.microsoft.com/windows/products, 2 pages, Mar. 1, 2007.

StockCharts.com, "Introduction to Candlesticks", (Web Archive), Feb. 9, 2007, 14 pgs.

Spritzer et al., "A Visual Tool to Support Technical Analysis of Stock Market Data", ACM, AVI 2006, pp. 512-515.

U.S. Office Action issued for U.S. Appl. No. 13/898,978 dated Feb. 9, 2016, 17 pgs.

Netvibes, http://web.archive.org/web/20070314040317/http://netvibes.com/?, 1 page, Mar. 14, 2007.

Programmable Web, "Mashups And The Web As Platform," http://web.archive.org/web/20070314041505/http://www.programmableweb.com/, 2 pages, Mar. 14, 2007.

U.S. Office Action issued for U.S. Appl. No. 13/898,978 dated Jul. 27, 2016, 5 pages.

Goldman Sachs, "Goldman Sach Electronic Trading—REDI(R) Trader", Web.Archive.Org, Jul. 25, 2012, 2 pages.

Goldman Sachs, "GSET: Goldman Sachs Electronic Trading," 2 pages, May 10, 2012.

International Search Report and Written Opinion issued for PCT/US2008/076841 dated Nov. 21, 2008, 12 pgs.

StockCharts.com, "Introduction to Candlesticks", Feb. 28, 2007, 16 pgs.

StockCharts.com, "Rate of Change (ROC) and Momentum", Nov. 8, 2006, 2 pgs.

Ask E.T., "Grpahic: Stock Performance", http://web.archive.org/web20050109091808/http://www.edwardtufte.com/bboard/q-and-a-fetch-msg?msg_id=1, Sep. 3, 2003, 2 pgs.

Tufte, Edward, "Sparklines: Intense, Simple, Word-Sized Graphics", Beautiful Evidence, May 27, 2004, 42 pgs.

Ask E.T., "Runnings—Baseball Standings On The Run," http://web.archive.org/web/20061019051235/http://www.edwardtufte.com/bboard/q-and-a-fetch-msg?msg id=00011 h&topic id=1, 12 pages, Aug. 2, 2006.

Carter, Ryan, "Convert Web Widgets Into Vista Sidebar Gadgets," http ://downloadsquad .switched .com/200 7 /02/20/convert-web-widgets-i nto-vistasidebar-gadjets, Feb. 20, 2007, 7 pgs.

Pageflakes, "The Whole Web At Your Fingertips!", http://web.archive.org/web/20070210023733/http://pageflakes.com/, 2 pages, Feb. 10, 2007.

Uber, "What is Uber?", http://web.archive.org/web/20070305133750/http://www.uber.com/, Mar. 5, 2007, 2 pgs.

YubNub, "A (Social) Command Line for the Web", http://web.archive.org/web2007031509344/http://yubnub.org/, Mar. 15, 2007, 1 pg.

Dapper, "The Data Mapper," http://web.archive.org/web/20070315093441/http://www.dapper.net/, Mar. 15, 2007, 1 pg.

Teqlo, "A Better Web Experience", http://web.archive.org/web/20070310034135/http://www.programmableweb.com/, Mar. 14, 2007, 2 pgs.

Webmashup.com, "Mashups & Web 2.0 API Directory—Widgets," http://web.archive.org/web/20070318184313/http://webmashup.com/, 2 pages, Mar. 13, 2007.

Google, "Desktop Download," http://web.archive.org/web/20070315034833/http://desktop.google.com/, 1 page, Mar. 15, 2007.

Google, "Desktop Gadgets," http://web.archive.org/web/20070316052408/http://desktop.google.com/plugins/c/sidebar/finan ce.html, 1 page, Mar. 16, 2007.

WordPress, "Widgets," http://web.archive.org/web/20070315111338/http://widgets.wordpress.com/?, 5 pages, Mar. 15, 2007.

Zillow, "Real Estate Valuations, Homes For Sale, Free Real Estate Information," http://web.archive.org/web/20070315182404/http://www.zillow.com/, 3 pages, Mar. 15, 2007.

Visual Sciences LLC, "Real Time Visual Analysis," http:/lweb.archive.org/web/20070315112021/http://www.visualsciences.com/applications _ vsite . asp?a= 2>, 1 page, 2006.

Marumushi, "Newsmap," http://web.archive.org/web/20070313233154/http://www.marumushi.com/apps/newsmap/, 3 pages, Mar. 13, 2007.

* cited by examiner

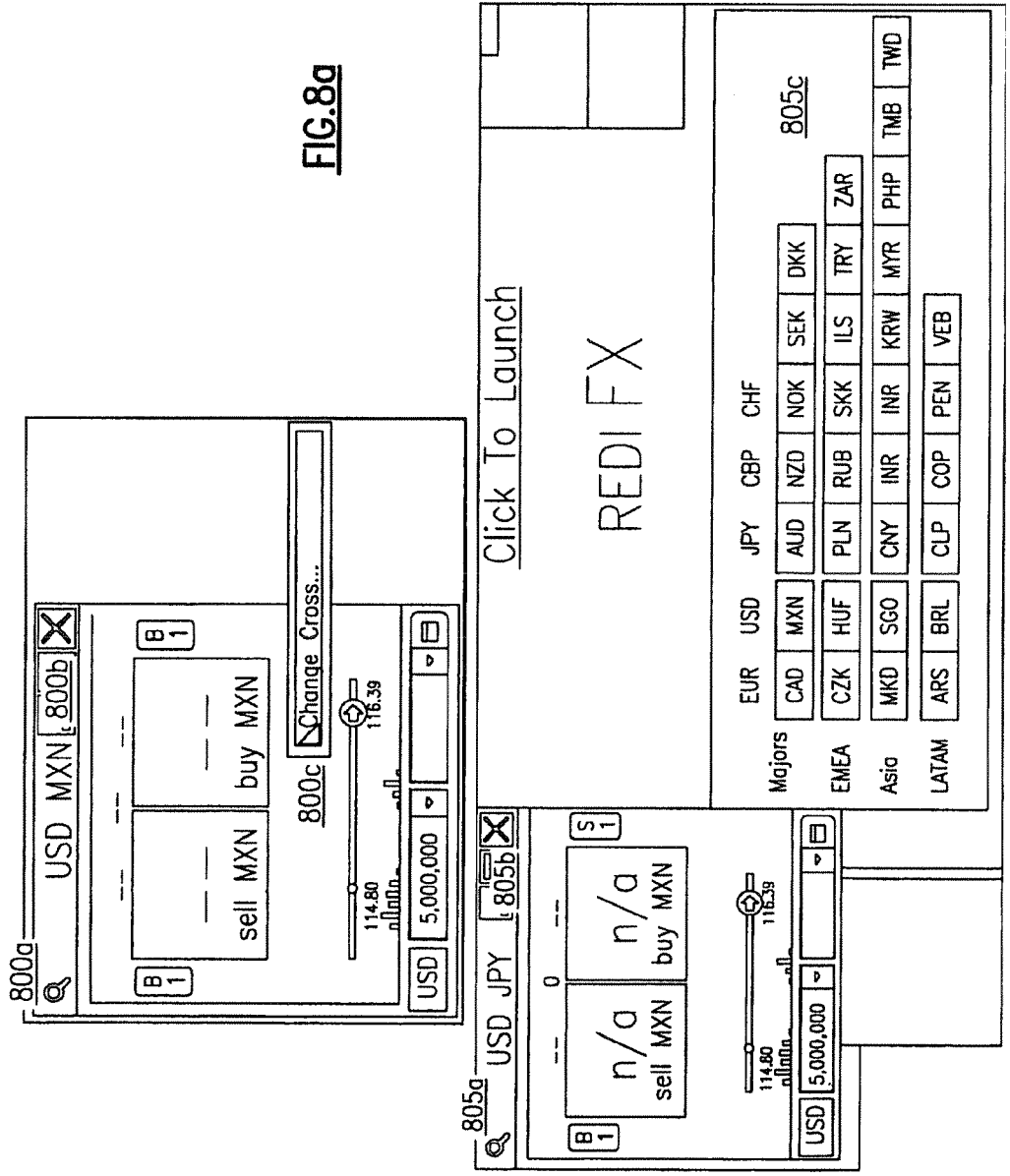

FIG.8b

|   | 911 | 912 | 913 | 914 | | | |
|---|---|---|---|---|---|---|---|

910a — Majors

| Cross | Bid. | Ask | Low | High |
|---|---|---|---|---|
| EUR USD | 1.3380 | 1.3383 | | |
| GBP USD | 1.9552 | 1.9565 | | |
| USD CAD | 1.1506 | 1.1509 | | |
| USD JPY | 119.29 | 119.31 | | |
| USD CHF | 1.2333 | 1.2336 | | |
| USD MXN | 10.9593 | 10.9673 | | |
| EUR ZAR | 9.5158 | 9.5158 | | |
| EUR JPY | 15382 | 153.83 | | |
| GBP EUR | 34.63 | 34.67 | | |

910b — Emerging

| Cross | Bid | Ask | Low | High |
|---|---|---|---|---|
| EUR USD | 1.3380 | 1.3383 | | |
| GBP USD | 1.9552 | 1.8565 | | |
| USD CAD | 1.1506 | 1.1509 | | |
| USD JPY | 119.29 | 119.31 | | |
| USD CHF | 1.2333 | 1.2336 | | |
| USD MXN | 10.9593 | 10.9673 | | |
| EUR ZAR | 9.5158 | 9.5158 | | |
| EUR JPY | 15382 | 153.83 | | |
| GBP EUR | 34.63 | 34.67 | | |

910c — Latin America

| Cross | Bid | Ask | Low | High |
|---|---|---|---|---|
| EUR USD | 1.3380 | 1.3383 | | |
| GBP USD | 1.9552 | 1.9565 | | |
| USD CAD | 1.1506 | 1.1509 | | |
| USD JPY | 119.29 | 119.31 | | |
| USD CHF | 1.2333 | 1.2336 | | |
| USD MXN | 10.9593 | 10.9673 | | |
| EUR ZAR | 9.5158 | 9.5158 | | |
| EUR JPY | 15382 | 153.83 | | |
| GBP EUR | 34.63 | 34.67 | | |

910d — Skandies

| Cross | Bid | Ask | Low | High |
|---|---|---|---|---|
| EUR USD | 1.3380 | 1.3383 | | |
| GBP USD | 1.9552 | 1.9565 | | |
| USD CAD | 1.1506 | 1.1509 | | |
| USD JPY | 119.29 | 119.31 | | |
| USD CHF | 1.2333 | 1.2336 | | |
| USD MXN | 10.9593 | 10.9673 | | |
| EUR ZAR | 9.5158 | 9.5158 | | |
| EUR JPY | 15382 | 153.83 | | |
| GBP EUR | 34.63 | 34.67 | | |

903a – 903b

△ A warning note would go here if necessary.

FIG.9

| USD JPY = 119.43 | Rate |
|---|---|
| Absolute High | 278.57 |
| 5y High | 133.25 |
| 1y High | 122.5 |
| 6m High | 121.25 |
| 1w High | 119.75 |
| 1m High | 119.75 |
| Today's High | 119.53 |
| Yesterday's High | 119.25 |
| 55dma | 119.12 |
| Yesterday's Low | 118.73 |
| 100dma | 118.65 |
| Today's Low | 118.54 |
| 1w Low | 118.25 |
| 200dma | 117.79 |
| 1m Low | 116.17 |
| 6m Low | 115.35 |
| GS 3m Forecast | 115 |
| GS 6m Forecast | 115 |
| GSDEER Fair Value | 110.57 |
| 1y Low | 110.07 |
| 5y Low | 102.05 |
| Absolute Low | 81.09 |

FIG.10a

| USD CAD-schons @ QA | | CAD JPY-schons @ QA | |
|---|---|---|---|
| Bid | Ask | Bid | Ask |
| 0.9967 | 0.9974 | 108.32 | 108.42 |
| Absolute High | 1.8197 | Absolute High | 125.60 |
| 5y High | 1.5804 | 5y High | 125.60 |
| 1y High | 1.1879 | 1y High | 125.60 |
| GS 6m Forecast | 1.1000 | 6m High | 125.60 |
| GS 3m Forecast | 1.1000 | 1m High | 125.60 |
| 6m High | 1.0872 | 1w High | 114.46 |
| Today's High | 0.9975 | Today's High | 110.77 |
| 1m High | 0.9927 | Yesterday's High | 110.74 |
| 1w High | 0.9927 | Yesterday's Low | 108.18 |
| Yesterday's High | 0.9917 | 1w Low | 108.18 |
| Today's Low | 0.9822 | 1m Low | 108.18 |
| Yesterday's Low | 0.8803 | Today's Low | 108.15 |
| 1w Low | 0.9705 | 6m Low | 103.47 |
| 1m Low | 0.9061 | GS 6m Forecast | 100.00 |
| 6m Low | 0.9061 | GS 3m Forecast | 100.00 |
| 1y Low | 0.9061 | 1y Low | 94.58 |
| 5y Low | 0.9061 | 5y Low | 74.48 |
| Absolute Low | 0.9061 | Absolute Low | 72.82 |
| GSDEER Fair Value | -1.0000 | GSDEER Fair Value | -1.00 |
| 200dma | -9999.0000 | 200dma | -9999.00 |
| 100dma | -9999.0000 | 100dma | -9999.00 |
| 55dma | -9999.0000 | 55dma | -9999.00 |

APPARATUSES, METHODS AND SYSTEMS FOR A HIGH DENSITY FINANCIAL ASSET INFORMATION DISPLAY

CROSS-REFERENCE TO RELATED APPLICATIONS

This application is a divisional of U.S. patent application Ser. No. 14/045,676 filed Oct. 3, 2013, which is a continuation of U.S. patent application Ser. No. 12/233,175 filed Sep. 18, 2008, which claims the benefit of U.S. Provisional Patent Application No. 60/973,387 filed Sep. 18, 2007. The contents of all applications are incorporated herein by reference in their entirety for all purposes.

RELATED APPLICATIONS

This disclosure describes inventive aspects of at least 2 distinct inventions, including:

a high density financial asset information display (with a suggested Class/Subclass of 705/36);

a graphical user interface (with a suggested Class/Subclass of 715/700);

The instant application details claims directed to a high density financial asset information display (suggested Class/Subclass of 705/36). However, in order to develop a reader's understanding of the invention(s), the descriptions of the other invention(s) have been compiled into a single disclosure to illustrate and clarify how aspects of these inventions operate independently, interoperate as between individual inventions, and/or cooperate collectively. The disclosure goes on to further describe the interrelations and synergies as between any of the various inventions within the context of an overarching inventive system; all of which is to further ensure compliance with 35 U.S.C. § 112.

Furthermore, applicant hereby claims priority to under 35 USC § 119(e) for U.S. provisional patent application Ser. No. 60/973,387 filed Sep. 18, 2007, entitled "APPARATUSES, METHODS AND SYSTEMS FOR A HIGH DENSITY FINANCIAL ASSET INFORMATION DISPLAY".

The entire contents of the aforementioned applications are herein expressly incorporated by reference.

FIELD

The present disclosure is directed generally to apparatuses, methods, and systems for user interfaces, and more particularly, to apparatuses, methods and systems for a high density financial asset information display (hereinafter "HD-FAID").

BACKGROUND

Existing interfaces for presenting financial information includes the stock ticker, first utilizing paper tape and now available in electronic format. The ticker provides financial asset information. A ticker symbol identifies the stock (e.g., the company name of the stock), and an indicated price per share of the stock. Other information, such as whether the stock is trading higher or lower than the previous day's closing and the change amount (i.e., the difference in price from the previous day's closing) may also be indicated. The above information may be provided in financial sections/pages of newspapers and websites.

SUMMARY

Current displays and user interfaces do not provide a high density, straightforward, up-to-date, compact and comprehensive display for viewing and managing financial asset information. The conventional methods of supplying financial asset information is stifling potential user efficiencies and productivity gains.

The disclosure teaches APPARATUSES, METHODS AND SYSTEMS FOR A HIGH DENSITY FINANCIAL ASSET INFORMATION DISPLAY (hereinafter "HD-FAID"), which provides a high density, straightforward, unified, compact, dynamic and comprehensive display interface that presents users with a high volume of easy to understand financial asset information. This information may include the current price direction, the change in price over multiple time frames, the traded volume at price of the selected financial asset, and/or the like. The HD-FAID is dynamically updated with the latest financial information and is formatted to convey relevant changes in the information of interest in a way that is easily understood by users.

BRIEF DESCRIPTION OF THE DRAWINGS

The accompanying appendices and/or drawings illustrate various non-limiting, example, inventive aspects in accordance with the present disclosure:

FIGS. 8a and 8b provide sequences of screen image diagrams illustrating aspects of one non-limiting example embodiment of an interactive currency pair selection interface for APPARATUSES, METHODS AND SYSTEMS FOR A HIGH DENSITY FINANCIAL ASSET INFORMATION DISPLAY;

FIG. 9 is of a screen image diagram illustrating aspects of a multi-group list-view display of another embodiment of APPARATUSES, METHODS AND SYSTEMS FOR A HIGH DENSITY FINANCIAL ASSET INFORMATION DISPLAY;

FIGS. 10a-10d are of screen image diagrams illustrating aspects of different embodiments for key level selector displays of APPARATUSES, METHODS AND SYSTEMS FOR A HIGH DENSITY FINANCIAL ASSET INFORMATION DISPLAY;

FIGS. 14a-14d are of screen image diagrams illustrating aspects of placing orders for one embodiment of APPARATUSES, METHODS AND SYSTEMS FOR A HIGH DENSITY FINANCIAL ASSET INFORMATION DISPLAY;

FIGS. 15a-15b are of a screen image diagrams illustrating further aspects of one non-limiting embodiment of APPARATUSES, METHODS AND SYSTEMS FOR A HIGH DENSITY FINANCIAL ASSET INFORMATION DISPLAY.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

HD-FAID

For the purpose of illustrating various inventive aspects of the APPARATUSES, METHODS AND SYSTEMS FOR A HIGH DENSITY FINANCIAL ASSET INFORMATION DISPLAY (hereinafter "HD-FAID"), the following discussion includes the HD-FAID implemented in the context of conveying foreign exchange information and data. However, it is to be understood that this is a non-limiting implementation; there is significant flexibility, scalability, and adaptability associated with the HD-FAID. As such, there are a wide variety of possible implementations of the HD-FAID that may be configured to meet the needs of a variety of end users.

Figure 1:
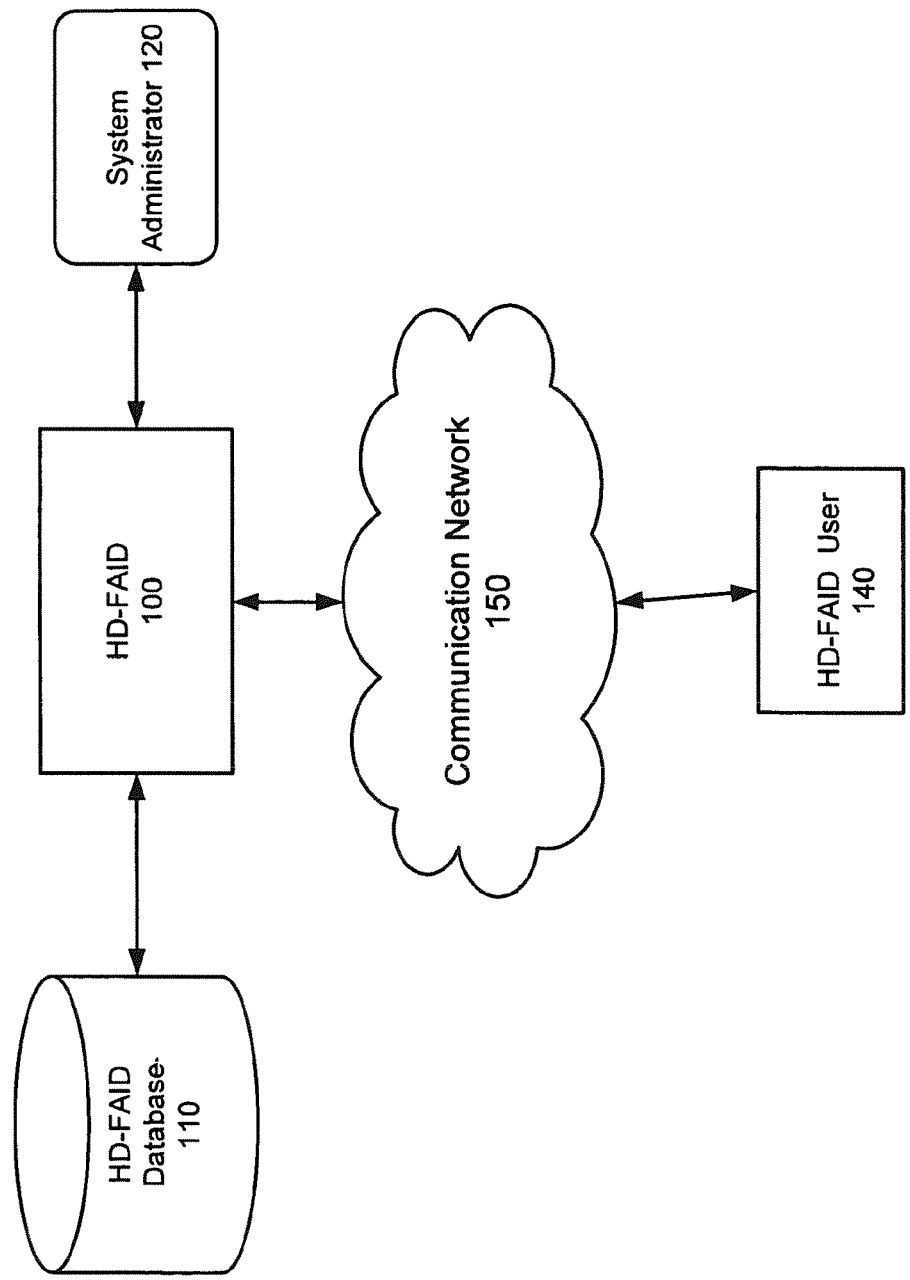
FIG. 1 illustrates aspects of interaction between various entities associated with an implementation of one HD-FAID.

FIG. 1 illustrates various entities that interact with the system according to one implementation of a HD-FAID 100. Generally, a user 140 interacts with the HD-FAID 100 and HD-FAID database(s) 110 to create a user profile that may include his User_ID, workspace ID, account type, account preferences, tracked financial asset selections, i.e., foreign exchange currency pair selections, and display preferences. In one embodiment, the HD-FAID database 110 may include several tables: a historical information table that may include fields such as, but not limited to: historical prices, historical analyses, and/or the like; a user table that may support and/or track multiple entity accounts on an HD-FAID 100; a current information table that may include fields such as, but not limited to: current price, current volume, current direction, up-to-date analyses, and/or the like; and a complementary currency pair table that may store information about all available currency pairs.

Based on the user's financial asset selection, the HD-FAID retrieves historical and current information associated with the user's financial asset selection from the corresponding tables in the HD-FAID database 110, and then uses the retrieved information, along with the user's display preferences, to provide a high density, straightforward, unified, compact, dynamic and comprehensive display interface that presents the user with a high volume of easy to understand financial asset information including the current buy and sell prices, the current price direction, the traded volume at price, and the change in price over multiple time frames. The High Density Financial Asset Information Display is dynamically updated with the latest financial information and is formatted to convey relevant changes in the information of interest in a way that is easily understood by users. The various entities connected with the HD-FAID may be interconnected via communication network 150.

Figure 2:
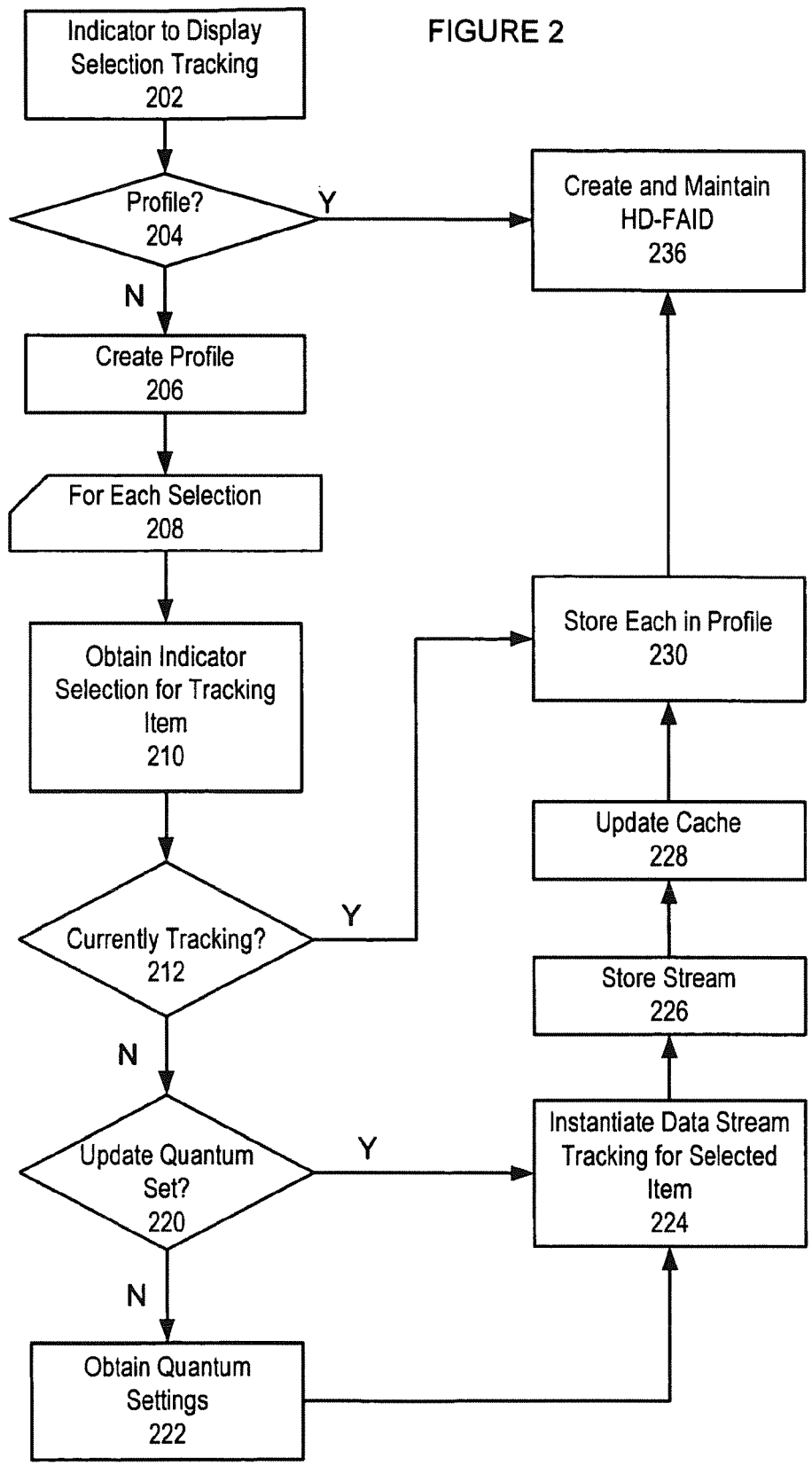
FIGS. 2 and 3, collectively, are of a logic flow diagram illustrating a non-limiting example of an indicator to display selection tracking for the HD-FAID.
Figure 3:
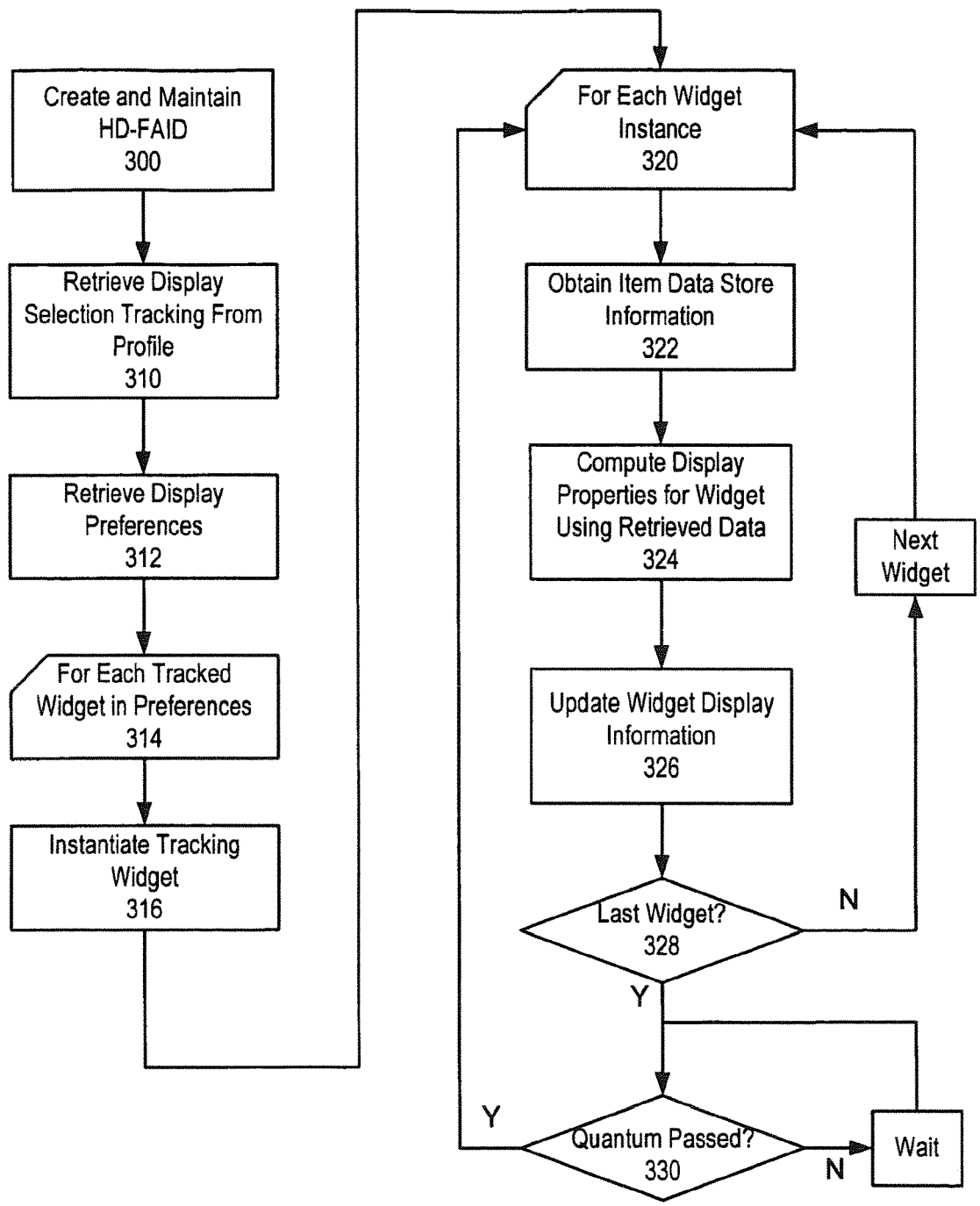

FIGS. 2 and 3, collectively, are of a logic flow diagram illustrating a non-limiting example of an indicator to display selection tracking 202 for the HD-FAID. When a user 140 accesses the HD-FAID, it performs a test 204 to determine if a user profile exists in the user table of the HD-FAID database 110. If a user profile does exist, then the HD-FAID creates and maintains a high density financial asset information display 236. (See FIG. 3 for additional details.) If, however, it is determined 204 that a user profile does not exist in the user table of the HD-FAID database 110, then the HD-FAID creates a user profile 206. In one embodiment, the user profile may include fields such as, but not limited to: user_ID, account type, account preferences, workspace ID, tracked financial assets, and/or the like. Subsequently, and for each item selection 208, i.e., for each currency pair selection, the HD-FAID stores the selected item in the user profile 230. (Details on one embodiment of the currency pair selection interface are provided in FIGS. 7 and 8.) The HD-FAID determines 212 if the selected item is currently tracked, i.e., the HD-FAID runs a profile check to determine whether a user selected the item to track previously. If it is, then the item gets stored in the user profile 230, and the HD-FAID creates and maintains a high density financial asset information display 236. Otherwise, the HD-FAID checks to see if the quantum set for the selected item is updated 220, and if it is not, it obtains the necessary quantum settings for the selected item 222, that may include the time quantum used to refresh the display. The data stream tracking for the selected item is then instantiated 224, the stream for the selected item is stored 226, the cache is updated with the selected item information 228, and the selection is stored in the user's profile 230. Finally, the HD-FAID creates and maintains a high density financial asset information display 236 as detailed in FIG. 3.

Figure 4A:
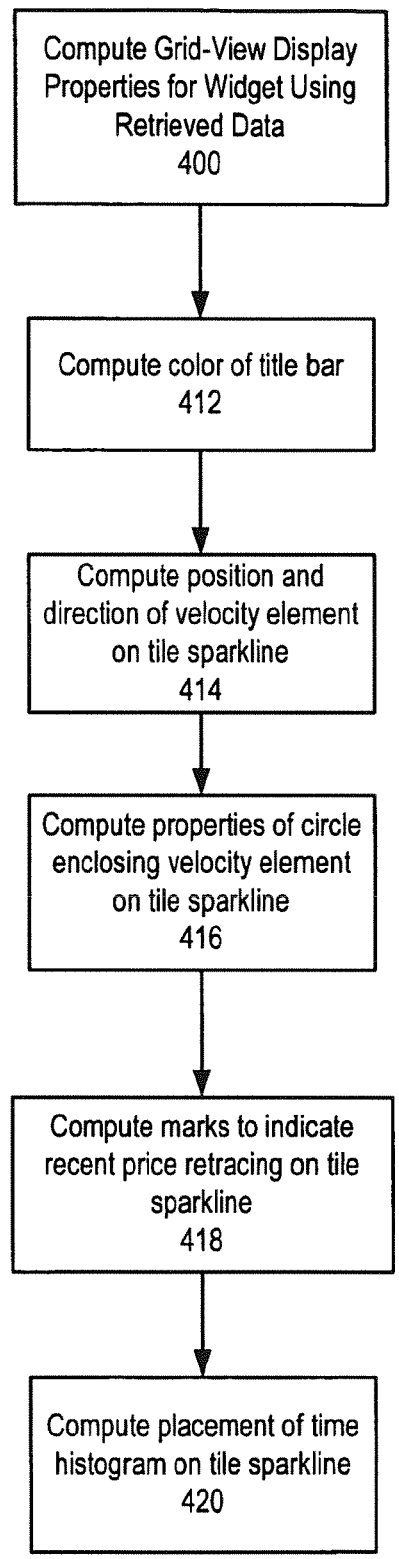
FIGS. 4a-4b are logic flow diagrams illustrating non-limiting examples of the computation of the HD-FAID's grid-view display properties.
Figure 4B:
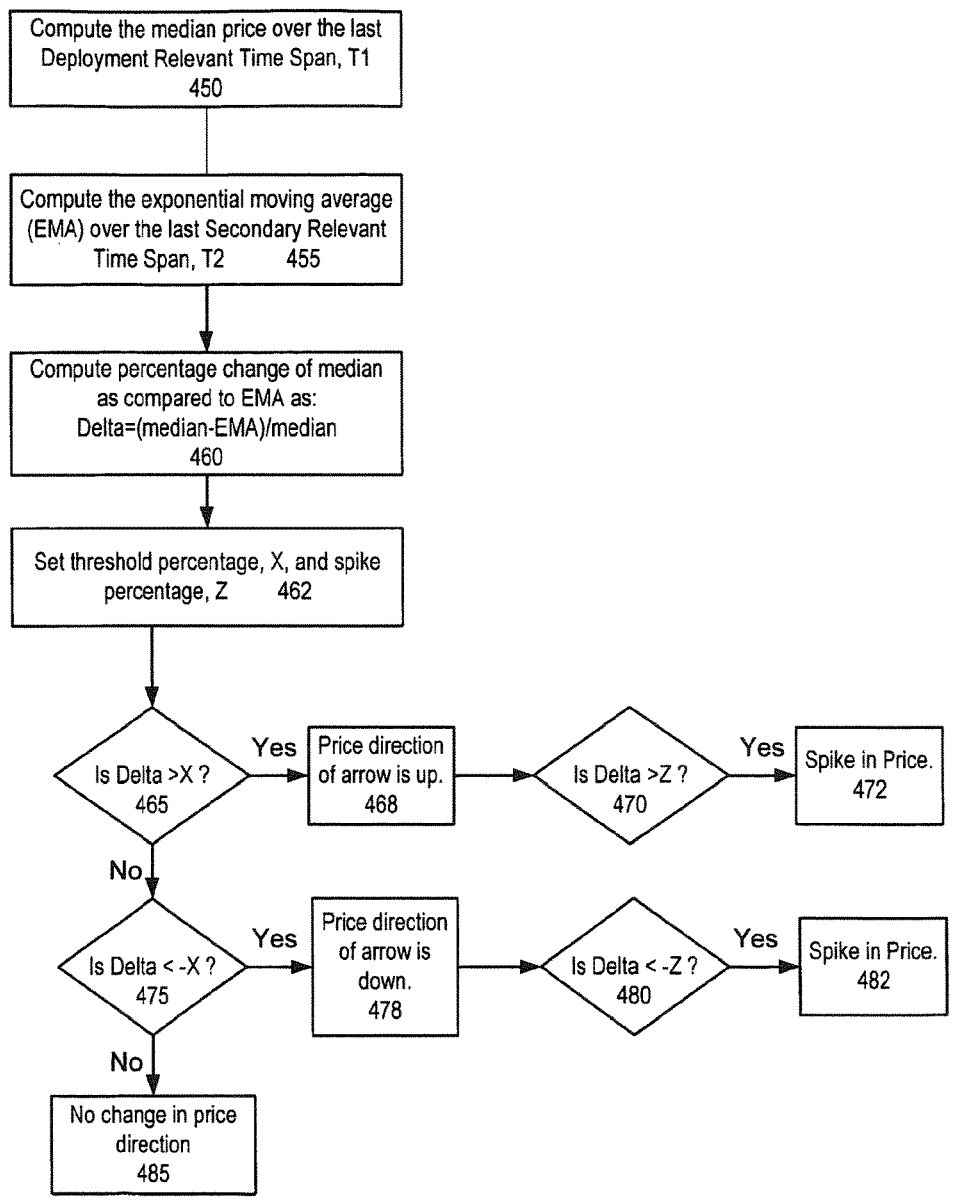
Figure 5:
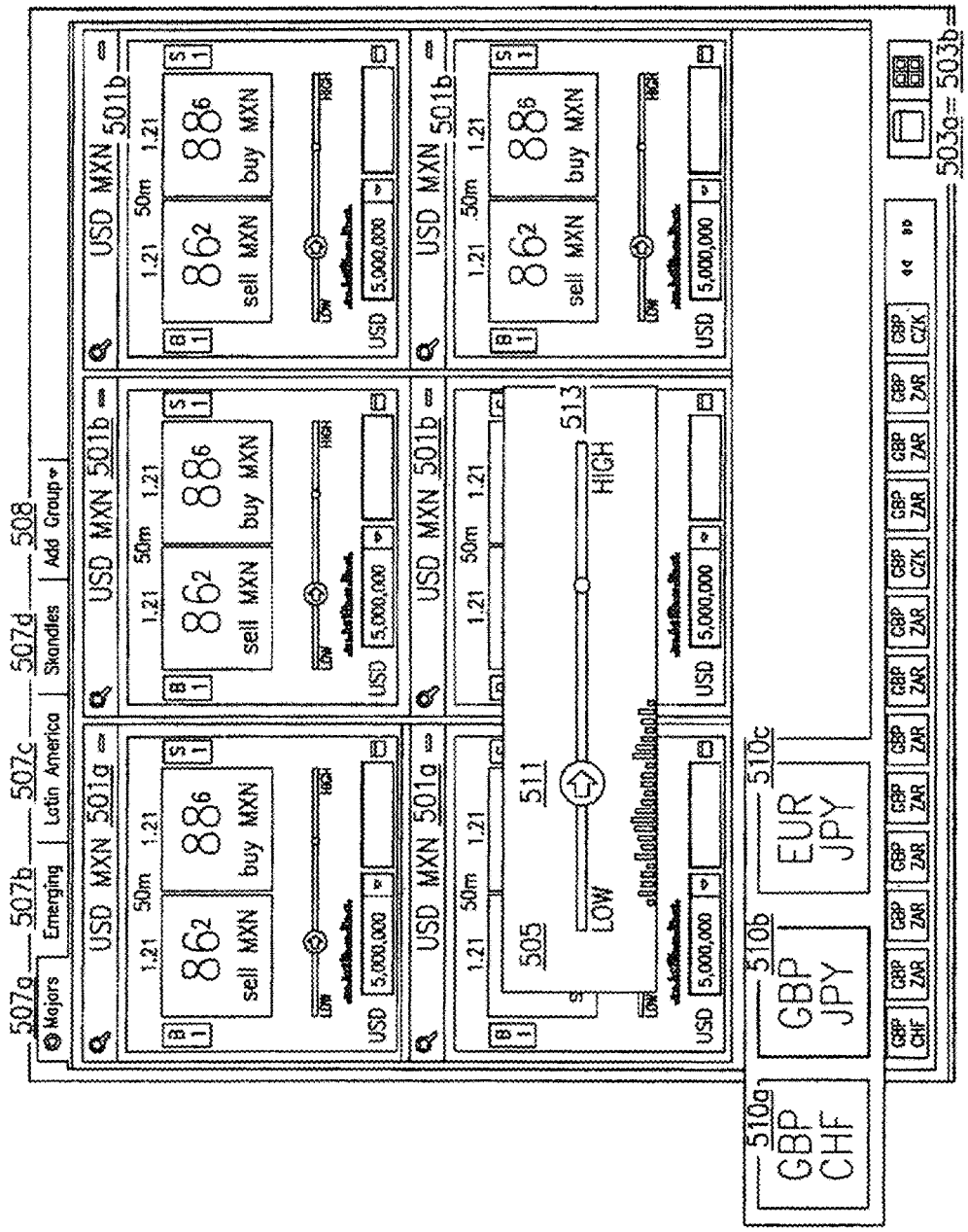
FIG. 5 is of a screen image diagram illustrating information display aspects of a grid-view display of an embodiment of APPARATUSES, METHODS AND SYSTEMS FOR A HIGH DENSITY FINANCIAL ASSET INFORMATION DISPLAY.
Figure 7:
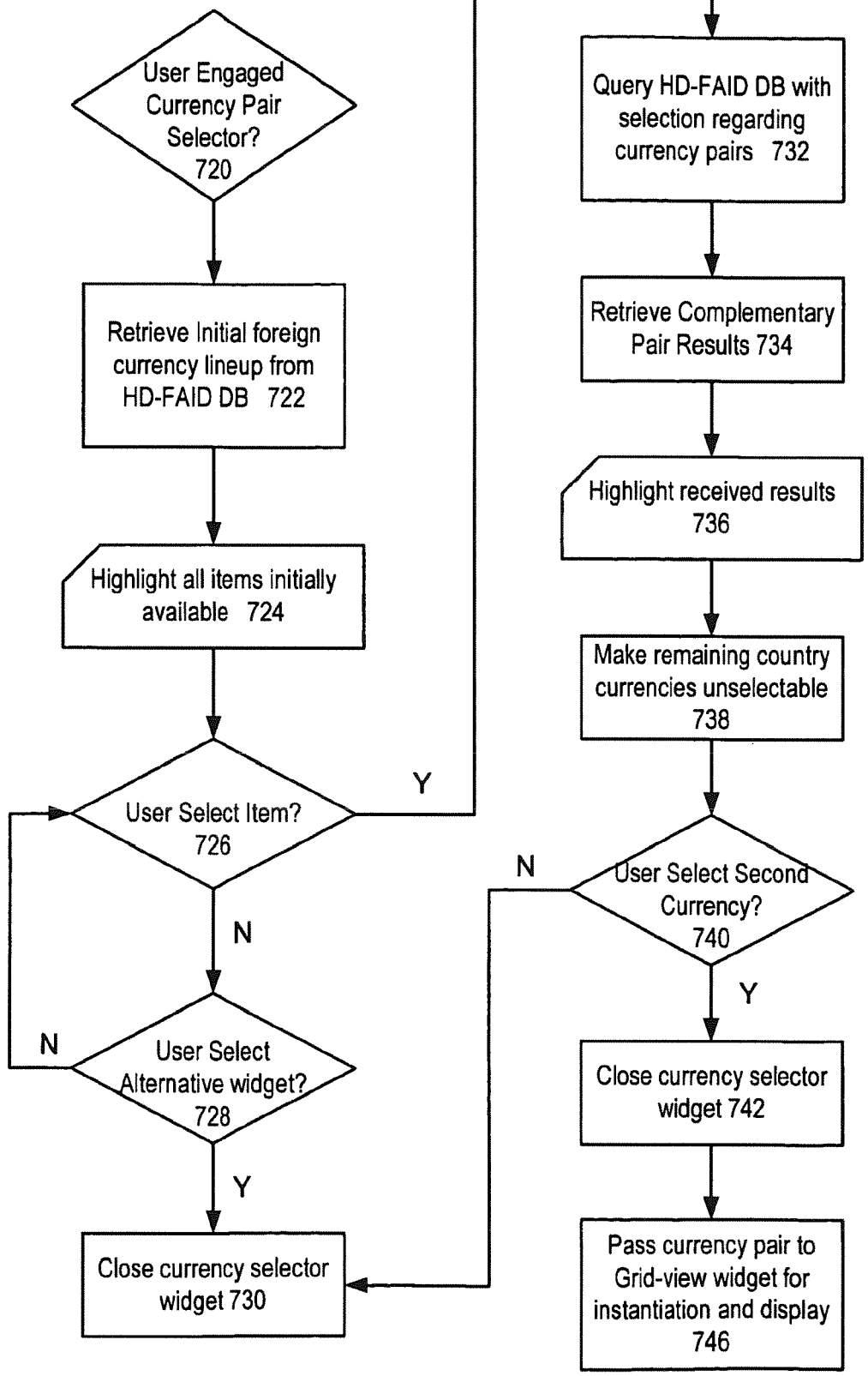
FIG. 7 is of a logic flow diagram illustrating a non-limiting example of an interactive currency pair selection interface for APPARATUSES, METHODS AND SYSTEMS FOR A HIGH DENSITY FINANCIAL ASSET INFORMATION DISPLAY.

As shown in FIG. 3, in order to create and maintain a high density financial asset information display, the HD-FAID retrieves the selection tracking from the user profile 310, along with the user's display preferences 312 that may include a grid-view display such as that of FIG. 5, a multi-group list-view display such as that of FIG. 7, and/or the like. For each tracked widget in the preferences, the HD-FAID instantiates tracking of the widget 316. Subsequently, and for each widget instance, the widget obtains the data store information for the item, (i.e., currency pair), from the historical and current information tables of the HD-FAID database 110 during 322. In one embodiment, a time-series database in a back-end server may get a financial data feed from a standard commercial source such as Reuters and then store the historical information of all available currency pairs. The obtained historical information may include historical open and close prices, historical volume traded, historical analyses, and/or the like. In one embodiment, upon receiving the data store information values, the HD-FAID may store such values in an array, stack, or heap and use them to compute display properties values used in the widget display 324. In one non-limiting embodiment, the current price for the currency pair is displayed on one tile of the display, and the coloring of the title bar of this tile is computed according to the price change of the currency pair on that day. If the current price of the currency pair is equal to the open price of that day, the coloring of the title bar would be gray; it is higher than the open price, the coloring of the title bar would be green; and if it is lower, the coloring would be red. Finally, the HD-FAID updates the widget display information 326. It should be noted that the tools used to display the widget may be implemented in Flash, Javascript, Visual Basic, and/or the like. (See FIG. 4 for additional detail on how the HD-FAID may compute, in one embodiment, some of the properties of a grid-view display such as that of FIG. 5.) This widget display update is done for every widget 328, and is periodically repeated after the elapse of a time quantum 330. In one embodiment, this time quantum may be in the order of seconds or less. In another embodiment, widgets do not poll, instead they are instantiated as delegates; as delegates they are updated in real time as soon as a cache, data stream, database, and/or any other data store using the widget as a delegate target are updated.

Figure 6:
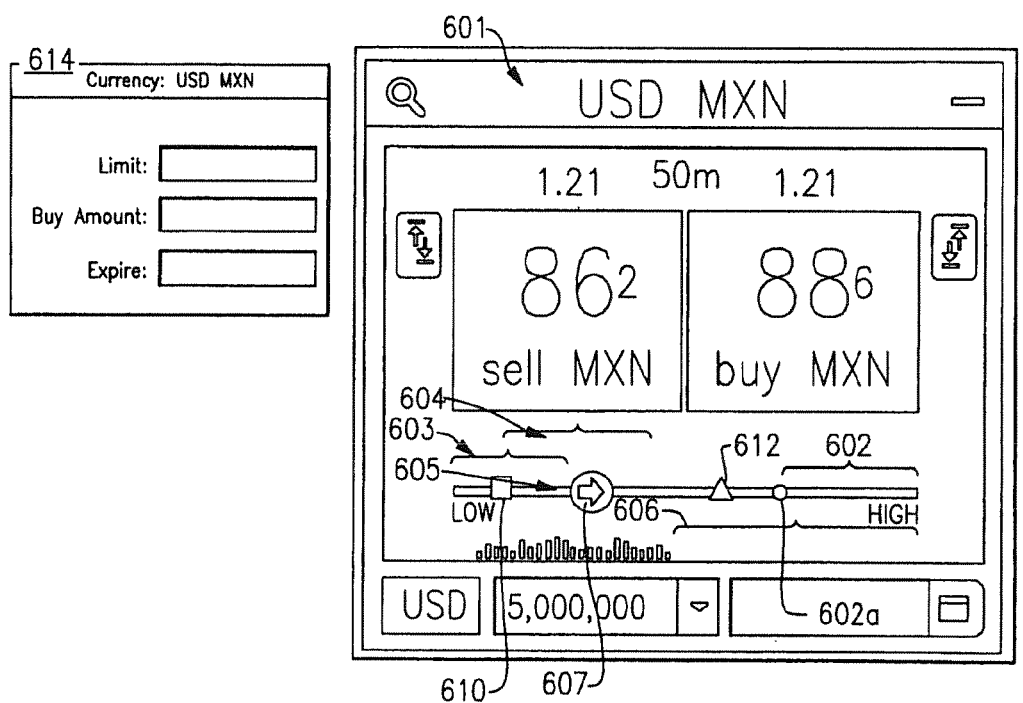
FIG. 6 is of a screen image diagram further illustrating information display aspects of a grid-view display of an embodiment of APPARATUSES, METHODS AND SYSTEMS FOR A HIGH DENSITY FINANCIAL ASSET INFORMATION DISPLAY.

FIGS. 4a-4b show a subset of the display properties that the HD-FAID may compute for each widget using the retrieved data 324, when the user's display preference corresponds to a grid-view display such as that of FIG. 5. As illustrated in FIG. 4a, the computed properties may include the coloring of the title bar of one tile on the grid-view display 412 according to the percentage price change of the displayed currency pair on that day. For example, the percentage price change of the displayed currency pair on a day is calculated by subtracting the open price on that day from the current price and then dividing by the open price. In one embodiment, the coloring of the title bar according to the percentage price change of the currency pair would be as follows: grey if the percentage change is within −0.1% to +0.1%, light green if it is within +0.1% to +1.5%, light red if it is within −0.1% to −1.5%, dark green if it is higher than +1.5%, and dark red if it is lower than −1.5%. The HD-FAID may further compute the position and direction of a velocity element on a tile sparkline display 414, the properties of a circle enclosing the velocity element on the tile sparkline 416, and marks to indicate recent price retracing on the tile sparkline 418. In one embodiment, such as that shown in FIGS. 5 and 6, an arrow 511 is used to denote the velocity element. This arrow is placed in a position on a sparkline tool 513 corresponding to the current price of the currency pair and is allowed to move within a region corresponding to that day's price range, i.e., between the low and high price of the currency pair for the day. Further, if the current price is higher than the moving average of the price of the currency pair in the last minute, the arrow points in one direction, and otherwise it points to the opposite direction. In one embodiment, if there are sudden changes in the price of the currency pair, the circle enclosing the arrow would be made to pulse. In one embodiment, pulsation may be achieved by increasing and decreasing the size of the circle and transparency element affecting a wake-like area around its perimeter. FIG. 4b provides an alternative embodiment for the computation of direction of the velocity element (arrow) and the properties of the circle enclosing the velocity element. In one implementation, the recent price retracing is indicated by displaying the green wake price range for the currency pair over the last 10 minutes (i.e., for prices that moved upwards towards the current price) with a green color, and a red wake price range over the last 10 minutes (i.e., for prices that moved downwards towards the current price). Finally, other computed display properties may include the placement of a time histogram on a tile sparkline 420, to give some indication of the amount of time the currency pair is traded at each price. In one implementation, the daily price range is divided into 30 equal price ranges and thus the time histogram will include 30 columns. Further, each histogram column would be scaled so that the tallest column does not exceed the number of pixels allotted to the time histogram section. FIGS. 5 and 6 are screen image diagrams providing details of grid-view display implementations with at least the above properties. It is to be understood that the rules used to compute the widget display properties for each selected item, i.e., currency pair, may differ in order to reflect price volatility for that item.

As discussed above, in a further HD-FAID embodiment, FIG. 4b provides a logic flow diagram for the computation of direction of the velocity element (arrow) and the properties of the circle enclosing the velocity element. In determining the direction of the arrow on the sparkline, the HD-FAID may calculate the median price over the last Deployment Relevant Time Span, T1, 450. Depending on the implementation and the volatility of the financial instrument under question, the time span, T1, may be set to different values. For example, in one implementation the time span, T1, may be set to 1 day, in another implementation T1 may be set to 1 hour, and in further implementations T1 may be set to 20, 10, or 5 seconds. When calculating the median price, the HD-FAID may first sort all the prices by value over the last T1, and the median price would be set equal to the price in the middle of the sorted prices. Once the median price of the currency pair over T1 is computed, the HD-FAID may compute the exponential moving average (EMA) over the last Secondary Relevant Time Span, T2, 455. Depending on the implementation and the desired sensitivity to price movements, T2 may be set to different values. For example, in one implementation T2 may be set to 1 week, in other implementations T2 may be set to 1 day, and in further implementations T2 may be set to 20, 10, or 5 minutes. In determining the EMA, in one implementation the HD-FAID may also use another time parameter, T3, that may take values of 1 hour, 30 minutes, 5 minutes, 60 seconds, 30 seconds or 10 seconds. The HD-FAID may compute the EMA according to the following formula:

$$EMA = \frac{\sum_{t=0,\ldots,T2}(\text{Price}(t) * \exp(-t/T3))}{\sum_{t=0,\ldots,T2}(\exp(-t/T3))}$$

The time granularity used in the summations of the above formula may be determined according to the set value for the time span T2. For example, if T2 is set to 5 minutes, the time granularity may be in the order of seconds and if T2 is set to 5 hours, the time granularity may be in the order of minutes. Once the EMA is computed, the HD-FAID may compute "Delta", the percentage change of the median price as compared to the EMA, 460 as follows:

$$\text{Delta} = \frac{(\text{median} - EMA)}{\text{median}}$$

In one embodiment, once Delta is computed, the HD-FAID may set two parameters 462, threshold percentage, X, and spike percentage, Z, that may be used in determining the price direction of the arrow and the properties of the circle enclosing the arrow. Using the computed value for Delta and the two parameters X and Z, the HD-FAID may then determine if Delta is greater than X 465. If it is, the price direction of the arrow on the sparkline is up 468. If Delta is not greater than X 465, the HD-FAID may determine if Delta is less than −X 475. If it is, the price direction of the arrow is down 478, and if it is not there is no change in the price direction of the arrow. In one implementation, when the price direction of the arrow is up a circle that may enclose the arrow may be colored green and when the price direction of the arrow is down, the circle that may enclose the arrow may be colored red. Furthermore, when Delta is greater than X 465 and Delta is also greater than Z 470, the circle enclosing the arrow would be made to pulse to indicate an upward spike in price. On the other hand, when Delta is less than –X 475 and Delta is also less than –Z 470, the HD-FAID may indicate a downward spike in price by making the circle enclosing the arrow to pulse. Depending on the implementation and the price volatility of the observed financial instrument, the HD-FAID may set the threshold and spike percentage values X and Z at different levels. For example, in one implementation the HD-FAID may set X to 0.05% and Z to 1%. In other implementations, X may be set to 0.5%, 0.05%, 0.01%, 0.005%, 0.0025% or 0.001% and Z may be set accordingly to 5%, 1%, 0.5%, 0.25% or 0.1%. It is to be understood that depending on the actual HD-FAID implementation the values for the threshold percentage X and the spike percentage Z may be different than the provided values.

FIG. 5 is a screen image diagram illustrating information display aspects of one non-limiting example embodiment of the HD-FAID. As mentioned above, the HD-FAID provides a high density, straightforward, unified, compact, dynamic and comprehensive display interface that presents users with a high volume of easy to understand financial asset information. The display shown in FIG. 5 provides a grid of information on currency spot prices 501*a*-501*f* that belong to the "Majors" category 507*a*. Non-displayed categories of currency pairs 507*b*-507*d* can be displayed by selecting the appropriate tab. Further, other categories of currency pairs can be added or created by selecting the "Add Group" tab 508 (see FIG. 13*a* for more details) and/or the currency pair selector of FIG. 8. Users may also select the multi-group list-view display (see FIG. 9 for additional detail) by selecting the appropriate button 503*a*, instead of the grid-view display button 503*b*. In one embodiment, the title bar (e.g., "USD MXN") of each tile on the grid is colored according to the percentage price change of the currency pair on that day (or in an alternative embodiment, change on that hour or other specified time period). In a further embodiment, background color of the tile may indicate the change in price over a shorter period than the period indicated by the title bar. In this embodiment, light green (e.g., 501*b*) indicates a moderate increase in price while dark green (e.g., 501*a*) indicates a substantial increase in price. Similarly, light red (e.g., 501*e*) indicates a moderate decrease in price while dark red (e.g., 501*d*) indicates a larger decrease in price. Depending on the implementation, alternative coloring schemes may be employed. In one embodiment, users may select their own color combinations so that the HD-FAID provides customized and more meaningful information to each individual user. Each tile also has a sparkline 505 that contains a high density of market information associated with the displayed currency pair (see FIG. 6 for additional details). For non-displayed tiles 510*a*-510*c*, the coloring of the tiles may be set to alert the user as to the "heat" or activity of the information represented by the tile (e.g., dark green 510*a* indicating a substantial increase in price on the day, dark red 510*b* indicating a substantial decrease in price, and grey 510*c* indicating no significant change in price). The computation of the coloring may be done in a similar way to that described for FIG. 4. Furthermore, the interface may allow users to execute a currency pair trade by pressing the appropriate buy 520 or sell 521 buttons. In one implementation, once a currency pair trade order is placed, the HD-FAID initially processes the order and stores it using SecDB. In a further implementation, users may be able to execute a currency trade by double-clicking on either the displayed buy or sell price. It should be noted that the buy and sell prices for each currency pair may be different for different users. For example, for an experienced user that performs significant currency volume trades every month, there may be a smaller spread between the buy and sell prices for each available currency pair.

FIG. 6 is a screen image diagram further illustrating aspects of the HD-FAID. In one embodiment, the tile display properties are computed as detailed in the discussion of FIG. 4. As described in FIG. 5, the red coloring of the title bar 601 indicates that the USD MXN is down on the day, i.e., the current price indicated by the arrow 607, (i.e., the sparkline velocity element), is lower than the opening price 602*a*. In one implementation, the opening price of the pair corresponds to the price of the currency pair at 5 pm NY time of the previous day. In further implementations, users may be able to adjust the opening price to what would work better for them, e.g. a user in Japan may set the opening price to be the price of the currency pair at 5 pm Tokyo time of the previous day. Moving to the tile sparkline 505, the display indicates that even though the price of the currency pair is down, it had once been up on the day 602, i.e., the absolute high price of the currency pair for the day is higher than the opening price 602*a*. In 603, the sparkline shows that the current price is also well off the absolute low. 604 shows the pushing to retrace the downswing of the past 10 minutes. In some embodiments, a marker may leave a trail to indicate past locations, with the trail decaying over time. For example, if a price or other indicator trails down, red marks may be left to the right side of the marker, and if the price starts to come back green marks may be left on the other side of the marker. In a further embodiment, the marks could fade and eventually disappear as time passed. In one embodiment, the marks may be computed as described in FIG. 4 by comparing the current price of the currency pair to the price range of the currency pair of the last 10 minutes, indicating the price range of the last 10 minutes lower than the current price with a red color, and the price range of the last 10 minutes higher than the current price with a green color. The direction of the arrow on the sparkline display 605 may be used to show the recent price direction of the currency pair. As indicated by the directionality of the arrow in FIG. 6, the recent price direction is higher. In one embodiment, the recent price direction may be computed as discussed in FIG. 4, by comparing the current price of the currency pair to the moving average of the price over the last minute. The bottom part of the sparkline 606 displays a time histogram of the price of the currency pair for the day, and shows that the currency pair has been traded most of the day in the current price range. If there is a break past the recent high, the market did not really spend much time above this range and may try to close the gap higher. The circle enclosing the arrow 607 may, in some embodiments, start pulsing if there is a sudden jump in the price of the currency pair. In one embodiment, this may occur if the magnitude of the percentage change of the price in the last minute is above a threshold of 1%. In a further embodiment the directional arrow may be tied to buy/sell buttons on the display. The circle in FIG. 6 is not pulsing, and therefore indicates that the market is progressing up (i.e., in the direction of the arrow), but does so at a non-violent pace. In one embodiment, a user may place buy 610 and sell 612 widgets on the sparkline; such widgets would present the user with a dialogue box 614 allowing them to place limit orders specifying a transaction. In one embodiment, these points may be set by clicking at points on the spark line and thereby prepopulating the dialogue box with approximate prices; in such an embodiment a pop-up menu may specify if the limit order is a buy or sell. In another embodiment, the user may right-click on the spark line specifying a buy/sell order before the dialogue box is displayed. If the spark line pushed to these points, the specified order would be placed automatically.

In one embodiment, FIG. 7 is of a logic flow diagram illustrating a non-limiting example of an interactive currency pair selection interface for the HD-FAID. When a user engages the currency pair selector widget 720, the HD-FAID retrieves an initial foreign currency lineup from the HD-FAID database 722, and highlights, on the currency pair selector interface, all currencies initially available to the user 724. (See, for example, the first screen image diagram of FIG. 8b). If a user does not select one of the highlighted items 726 and instead selects an alternative widget 728, like the key level selector widget of FIG. 10, the HD-FAID closes the currency pair selector widget 730 and displays the alternative widget. If, however, a user selects one of the highlighted currencies 726, a query is sent to the HD-FAID database using the first currency user selection 732 as a parameter to select and retrieve the list of currencies complementary to this first currency user selection 734. In one embodiment, currency pairs may be stored in a currency pair table in the HD-FAID database. Based on the retrieved list of complementary currencies, the HD-FAID highlights all available complementary currencies 736 on the currency pair selection interface and makes the remaining currencies unselectable 738. Finally, if a user decides to select a second currency from the available, highlighted ones 740, the HD-FAID closes the currency pair selector widget 742 and passes the currency pair information to the grid-view display widget for instantiation and display 746 (as discussed in FIGS. 4, 5 and 6). If, on the other hand, the user chooses not to select a second currency from the available ones 740, the HD-FAID closes the currency pair selector widget 730 before the currency pair selection is complete.

In one embodiment, FIG. 8a provides a sequence of screen image diagrams illustrating one non-limiting example embodiment of the currency pair selection interface for the HD-FAID. The first screen image diagram 800a shows that the currency pair selection interface can be invoked by clicking on the background of the tile and then clicking on the "Change cross . . . " tab 800c. As shown in the second screen image diagram 805a, the currency pair selection interface 805c has four different categories of currencies (Majors, EMEA, Asia, and LATAM). In one implementation, the currencies in each row of the currency pair selection interface 805c may be first ordered by geographical and then by alphabetical parameters. For example, in the second row of the currency pair selection interface 805c the currencies are first ordered by geographical parameters, i.e., currencies in Central and North America, Oceania and Scandinavia, and then by alphabetical parameters.

Figure 8B:
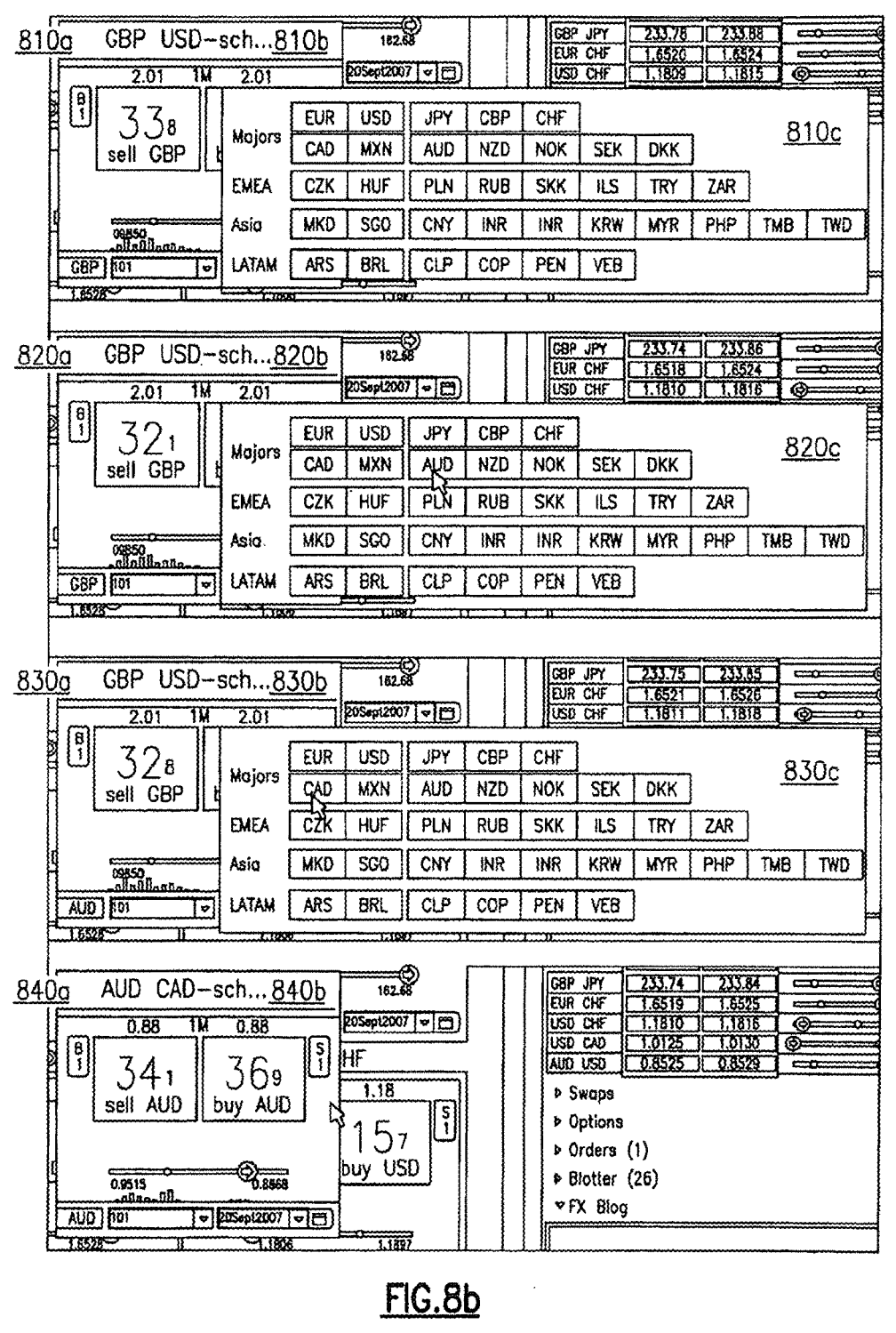

In another embodiment, FIG. 8b provides a sequence of screen image diagrams detailing the properties of the interactive currency pair selection interface and how it is used. As an example, the first screen image diagram 810a displays a tile 810b for the GBP USD currency pair, along with the currency pair selection interface 810c invoked to change the selection for the currency pair of tile 810b. All the currencies displayed on the currency pair selection interface 810c that are unavailable to a user are grayed out, i.e., all the currencies in the LATAM group. In one embodiment, the unavailable currencies might be unavailable for the day for all users or unavailable in general for a particular user. In another embodiment, the HD-FAID may store all available currency pairs for a particular user in the form of an array or linked list in the user profile. The second screen image diagram 820a shows that the selection for the first currency of the newly selected pair is AUD, which is highlighted. Based on this first currency selection, the HD-FAID then looks up the array, linked list and/or other appropriate data structure for all available currency pairs for the user in the user profile in order to determine the available currencies that are complementary to AUD. It should be noted that multiple instances of the data structure may be maintained for various clients so that each client may have selections made available that are appropriate for that client; e.g., for novice clients the number of pairings may be reduced, while more experienced clients may have a greater number of options. See Tables 1 and 2 for multiple and tiered examples of the data structure currency pairings.

TABLE 1

An example of data structure currency pairings

| |
| --- |
| ARS/USD |
| AUD/EUR |
| BRL/USD |
| CAD/EUR |
| CAD/USD |
| CHF/EUR |
| CHF/GBP |
| CHF/USD |
| CLP/USD |
| COP/USD |
| CZK/EUR |
| CZK/USD |
| DKK/EUR |
| DKK/GBP* |
| DKK/USD |
| GBP/EUR |
| HKD/USD |
| JPY/AUD |
| JPY/CAD |
| JPY/CHF |
| JPY/DKK |
| JPY/EUR |
| JPY/GBP |
| JPY/SEK |
| JPY/USD |
| MXN/USD |
| NOK/EUR |
| NOK/GBP* |
| NOK/USD |
| PEN/USD |
| PLN/EUR |
| PLN/USD |
| SEK/EUR |
| SEK/GBP |
| SEK/NOK |
| SEK/USD |
| SGD/USD |
| USD/AUD |
| USD/EUR |
| USD/GBP |
| USD/NZD |
| ZAR/EUR |
| ZAR/USD |

In the case displayed in diagram 820a, seven currencies (EUR, USD, JPY, GBP, CHF, CAD, and NZD) are available, and all other currencies are grayed out to indicate that they are unavailable as complementary selections to AUD. The currency pair selection interface 830c of the third screen image diagram 830a shows that the user selects CAD among the available complementary currencies. Once the second currency selection is made, the currency selection interface disappears and information about the newly selected currency pair, i.e., AUD CAD, gets displayed on the tile 840*b*.

TABLE 2

Another example of data structure currency pairings.

ARS/USD
AUD/EUR
AUD/GBP
AUD/GLD*
BRL/USD
CAD/AUD
CAD/EUR
CAD/GBP
CAD/NZD
CAD/USD
CHF/AUD
CHF/CAD
CHF/EUR
CHF/GBP
CHF/NZD
CHF/USD
CLP/USD
CNY/USD
COP/USD
CZK/AUD*
CZK/CAD*
CZK/CHF*
CZK/EUR
CZK/GBP*
CZK/HKD*
CZK/NZD*
CZK/USD
DKK/CHF
DKK/EUR
DKK/GBP
DKK/USD
EUR/GLD*
GBP/EUR
HKD/AUD*
HKD/CAD
HKD/CHF*
HKD/EUR
HKD/GBP
HKD/NOK*
HKD/NZD*
HKD/PLN*
HKD/SEK*
HKD/SGD*
HKD/USD
HUF/AUD*
HUF/CHF
HUF/EUR
HUF/GBP*
HUF/USD
IDR/USD
ILS/EUR
ILS/USD
INR/SGD
INR/USD
JPY/AUD
JPY/CAD
JPY/CHF
JPY/CNY*
JPY/CZK*
JPY/DKK
JPY/EUR
JPY/GBP
JPY/HKD
JPY/MXN
JPY/NOK
JPY/NZD
JPY/PHP
JPY/PLN
JPY/SEK
JPY/SGD
JPY/THB*
JPY/TWD*

TABLE 2-continued

Another example of data structure currency pairings.

JPY/USD
JPY/ZAR
KRW/EUR
KRW/JPY
KRW/USD
MXN/CAD
MXN/CHF
MXN/EUR
MXN/GBP
MXN/USD
MYR/USD
NOK/AUD*
NOK/CAD
NOK/CHF
NOK/EUR
NOK/GBP
NOK/NZD
NOK/USD
NZD/AUD
NZD/EUR
NZD/GBP
PEN/USD
PHP/USD
PLN/AUD*
PLN/CAD*
PLN/CHF*
PLN/EUR
PLN/GBP*
PLN/NZD*
PLN/USD
RUB/USD
SAR/USD*
SEK/AUD
SEK/CAD*
SEK/CHF
SEK/EUR
SEK/GBP
SEK/NOK
SEK/NZD
SEK/SGD
SEK/USD
SGD/AUD*
SGD/CAD*
SGD/CHF*
SGD/EUR
SGD/GBP*
SGD/NZD*
SGD/USD
SKK/EUR
SKK/USD*
THB/EUR*
THB/GBP*
THB/USD*
TRL/USD*
TRY/EUR
TRY/GBP
TRY/USD
TWD/USD
USD/AUD
USD/EUR
USD/GBP
USD/GLD*
USD/NZD
USD/SIL*
ZAR/AUD*
ZAR/CAD
ZAR/CHF*
ZAR/EUR
ZAR/GBP
ZAR/HKD*
ZAR/NZD*
ZAR/USD

FIG. 9 is a screen image diagram illustrating aspects of a multi-group list-view display for an embodiment of the HD-FAID. In the diagram, four categories of currency pairs 910*a*-910*d* are displayed, and in each category the currency pair (cross) 911, bid price 912, ask price 913 are listed, along with the sparkline 914. In another embodiment, a dot may be added to the sparkline to indicate opening price for the currency pair for the day. In a further embodiment, each currency pair label may also be colored according to the percentage change on the price of the currency pair on that day in a similar way to the coloring of the title bar of each tile in FIG. 6. Users may select the grid view display of FIG. 5 by pressing button 903b, instead of the multi-group list-view display button 903a. In a further embodiment, some of the selected currency pairs may be viewed using the grid-view display, and the remaining ones using the list-view display.

FIGS. 10a and 10b are of screen image diagrams illustrating aspects of different embodiments for key level selector displays of the HD-FAID. Key level selector displays provide information about the price movement of the currency pair over different time periods and may be employed by users in deciding at which price to place a buy or sell order for a currency pair. As will be seen later, the HD-FAID provides multiple ways of instantiating a key level selector display for a particular currency pair. In FIG. 10a, the large box 1001 indicates the price range plus the next key price level, like a reticle zooming in on its subject. The blue brackets 1002 zoom to the current day's range. The nearest levels above and below the current price are in the smaller box 1003. Depending on the implementation, fonts may be enlarged and/or bolded to impart a sense of relevance, urgency, importance and take away from the distraction of the rest of the table. Similarly, different types of levels may be color coded as another visual cue. A cross-hair and arrow 1004 may be utilized to show the current price with the direction of the arrow indicating the direction of a recent move, i.e., if the current price of the currency pair is higher than the moving average of the price over the last minute, the arrow points upwards; otherwise, it points downwards. Besides the high and low level prices for different time periods, the display may also contain different day-moving-averages (dma), such as 55-dma, 100-dma, and 200-dma, along with different forecast levels. The different price levels are displayed in descending order. As described above, in one implementation a time-series database in a back-end server may have a financial data feed from a standard commercial source such as Reuters and then store the historical information of all available currency pairs for a particular user.

Figure 10C:
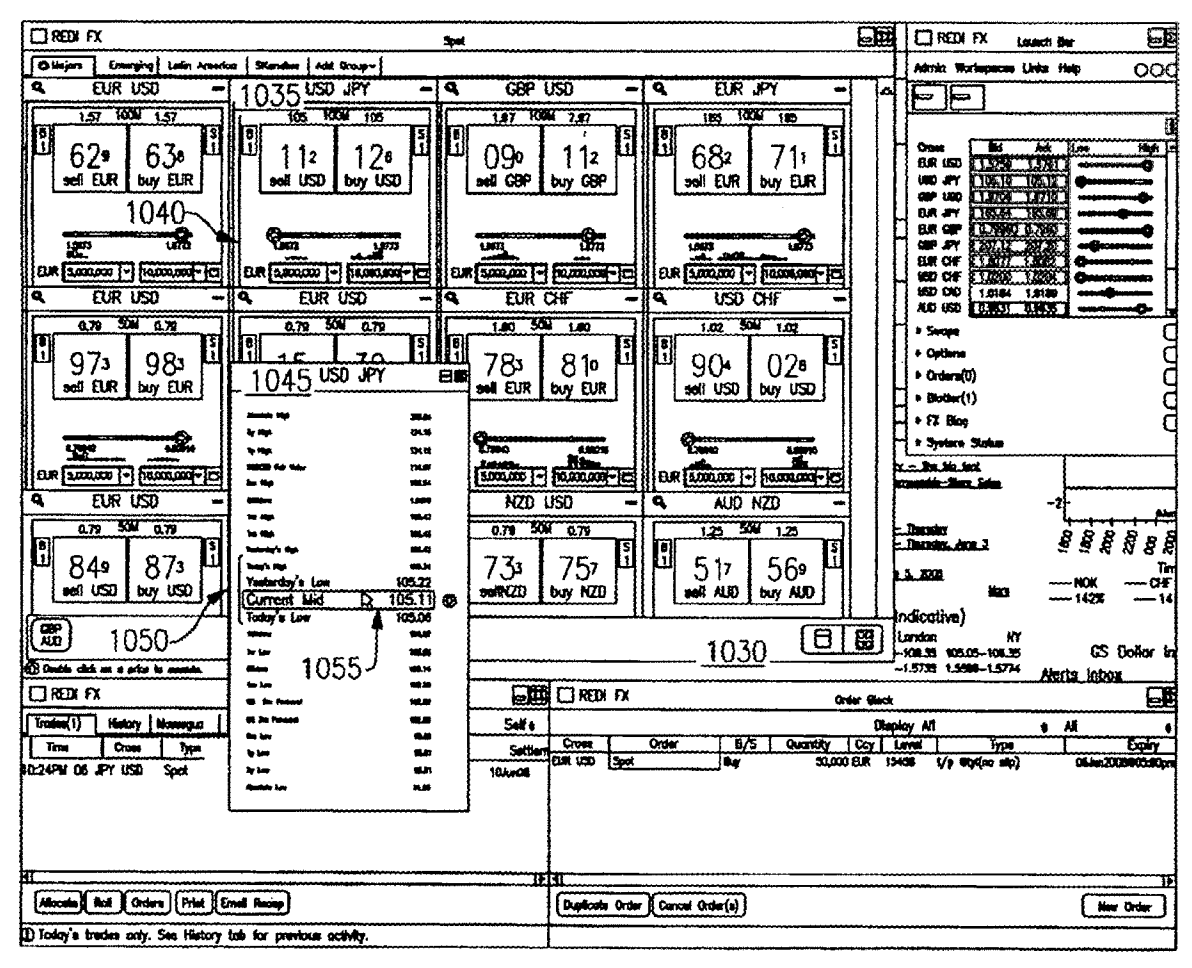

FIG. 10b is of a screen image diagram of a further embodiment of a key level selector display that contains very similar information to FIG. 10a, but places emphasis on important price levels in a different way. FIG. 10b also contains the current buy and sell prices, a sparkline such as that of FIGS. 5, 6 and 9, and uses a title bar coloring to indicate percentage change of price on the day such as the one used in the grid-view display of FIG. 5. FIG. 10c provides aspects of an implementation example of how a key level selector display such as that of FIG. 10b may be instantiated in a grid view display interface 1030. For example, if a user is interested in looking at the key price levels of the USD/JPY currency pair displayed in tile 1035, the user may be able to press a key icon 1040 in order to instantiate a key level selector display 1045. In one implementation, the HD-FAID may only update in real time the price levels indicated by 1050 in order to minimize the information exchange with the HD-FAID database. In another implementation, a user may be able to enter a currency pair trade by double clicking on the current mid level price 1055.

Figure 10D:
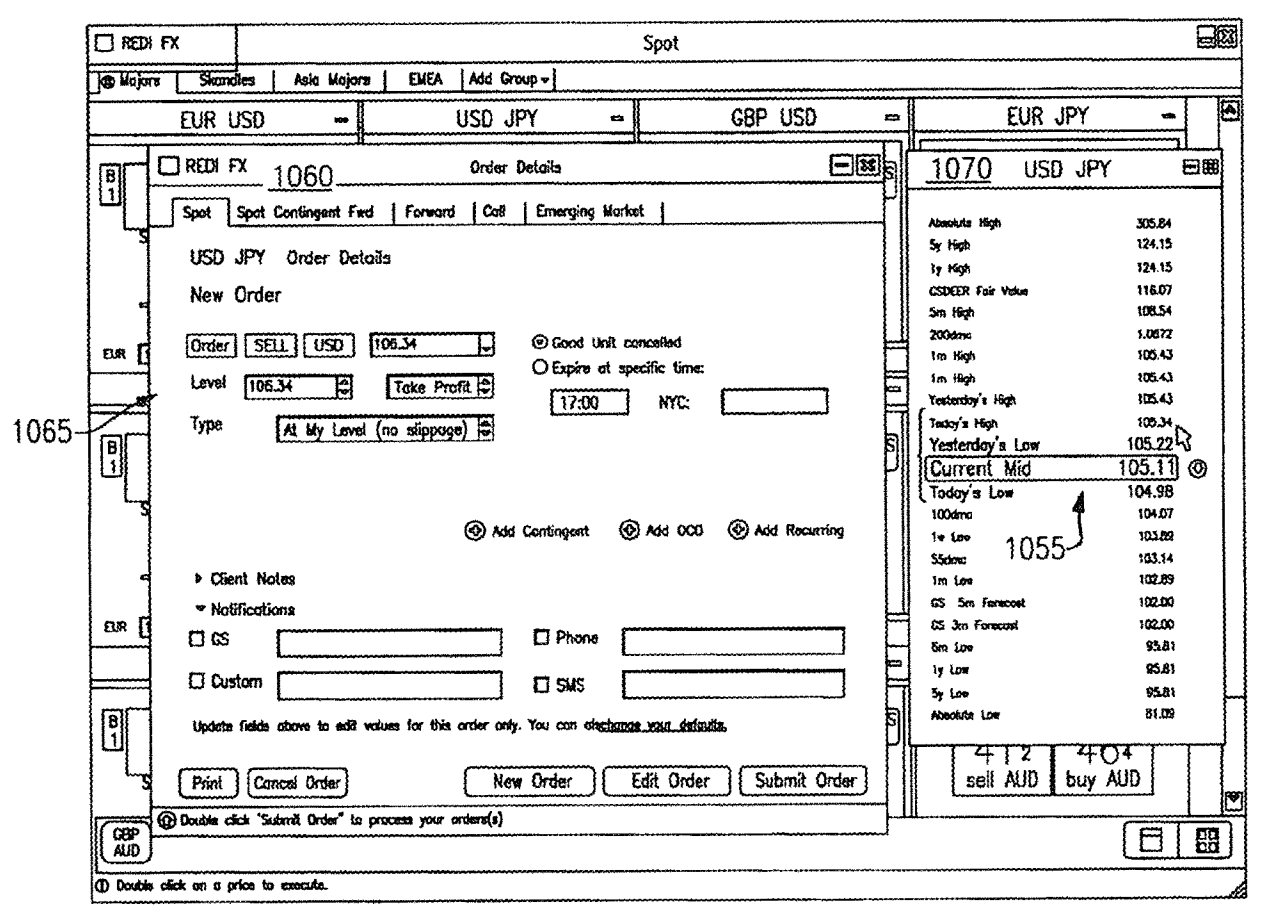

In a further implementation, such as that displayed in FIG. 10d, a user might decide to enter a USD/JPY currency pair trade by employing the order interface tile 1060. If a user needs more information about the key price levels for the USD/JPY pair, the user may be able to press a key icon 1065 to instantiate the key level selector display 1070. For example, the key level selector display 1070 shows that the high price for the USD/JPY pair for yesterday is 106.43, and the user may decide to enter a sell trade for 1,000,000 at 106.34.

Figure 11:
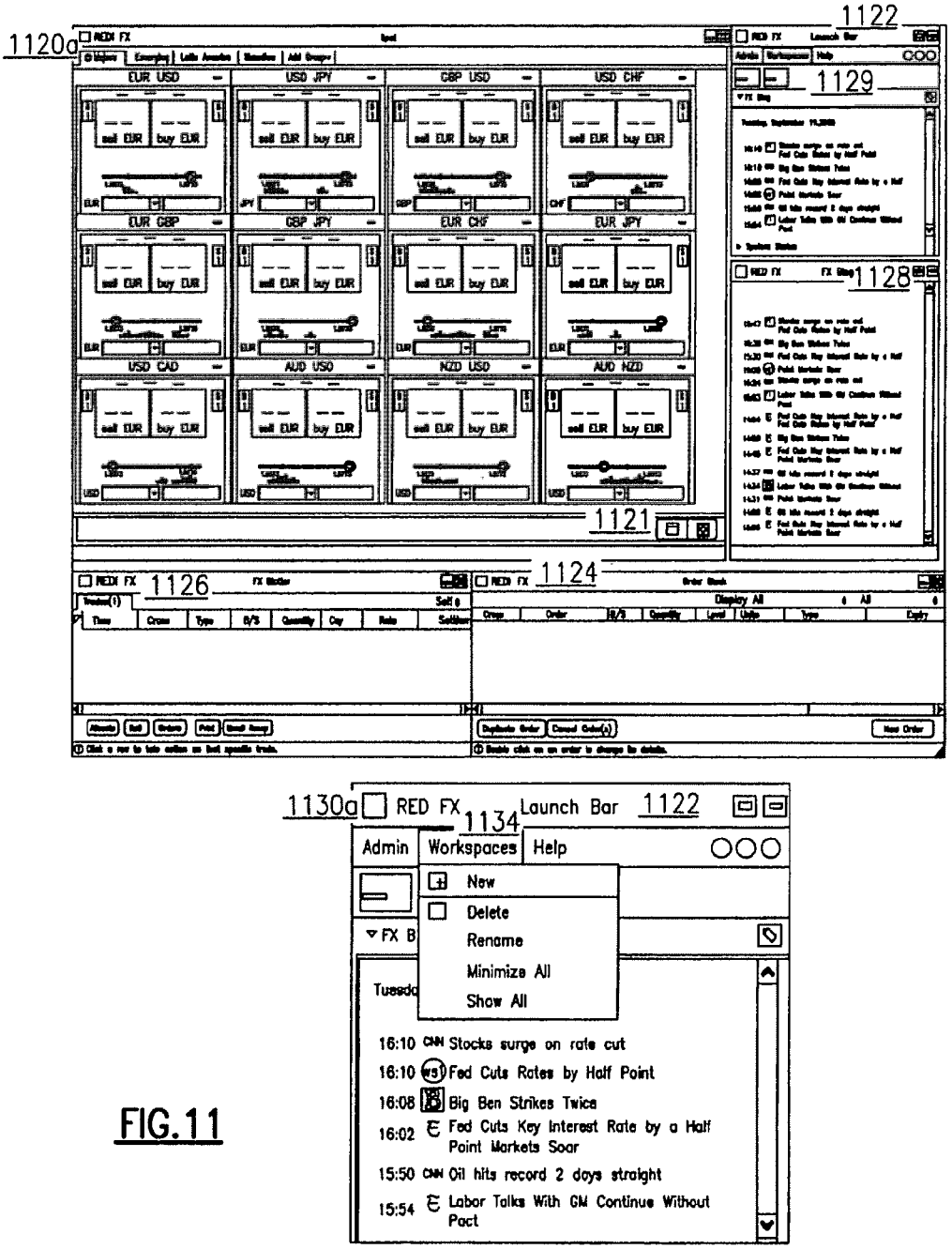
FIGS. 11 and 12 provide screen image diagrams illustrating further aspects of one non-limiting embodiment of APPARATUSES, METHODS AND SYSTEMS FOR A HIGH DENSITY FINANCIAL ASSET INFORMATION DISPLAY.
Figure 12:
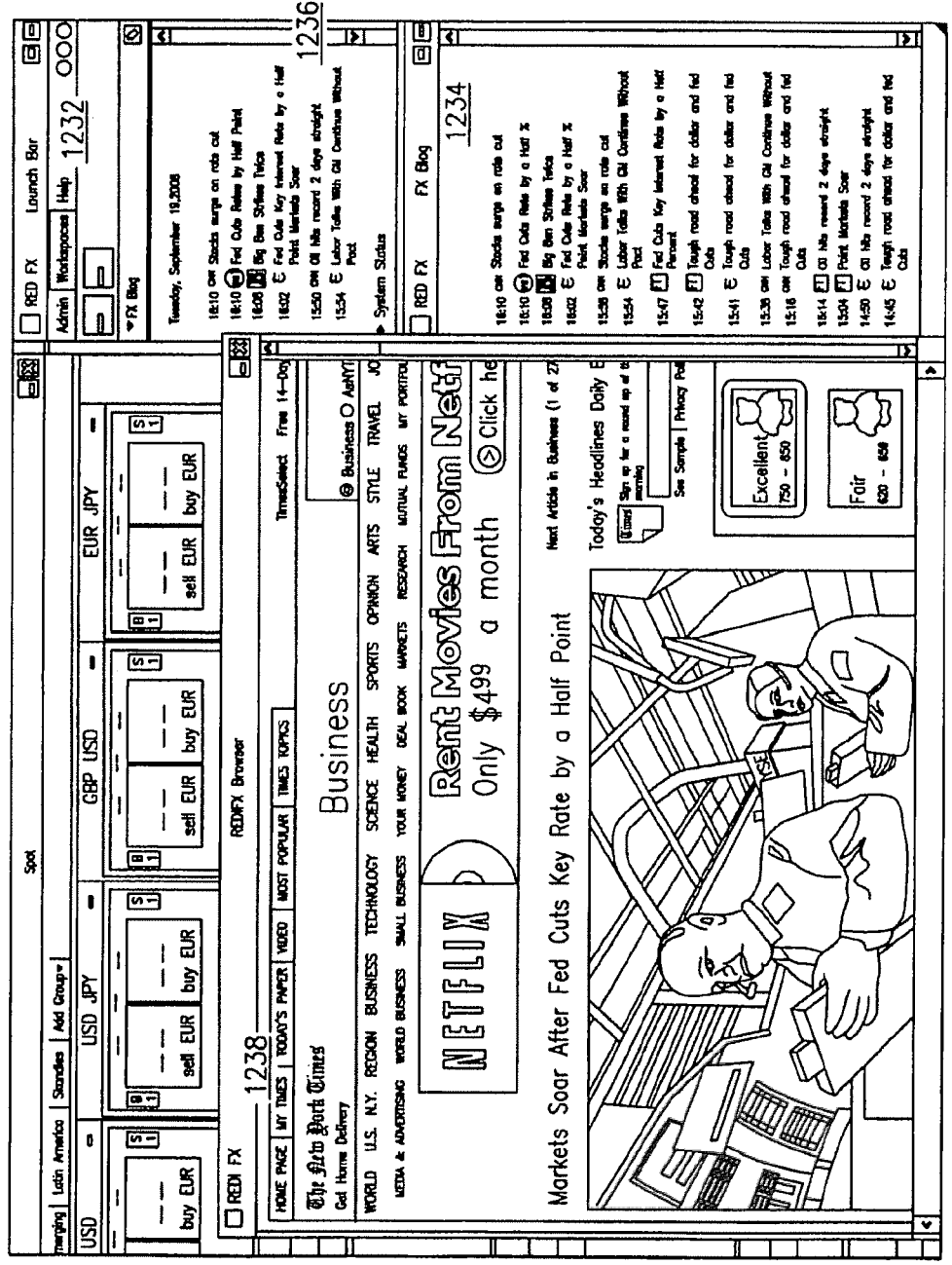

FIGS. 11 and 12 provide screen image diagrams illustrating further aspects of one non-limiting embodiment of the HD-FAID. The screen image diagram 1120a comprises of a grid view display as that of FIG. 5, a Launch Bar display 1122, an OrderBook display 1124, an FX blotter display 1126, and an FX Blog display 1128. As detailed in screen image diagram 1130a, the Launch Bar 1122 may be used to add a new workspace, rename or delete an existing workspace, and/or minimize all open workspaces. The OrderBook display 1124 and FX Blotter display 1126 may be used to display details for all the user entered orders and executed trades respectively. In one embodiment, another feature of the Launch Bar display 1122 are the miniaturized workspaces 1129, that allow a user of the HD-FAID to easily switch between the different available user workspaces by clicking on the corresponding miniaturized workspace. The FX Blog display 1128 is highly customizable and provides a list of financial headlines from all the major news sources. In one embodiment as displayed in FIG. 12, when a user clicks on a headline 1236, ("Fed Cuts Key Interest Rate by a Half Point; Markets Soar"), a browser window 1238 opens up displaying the full story in its original context.

Figure 13A:
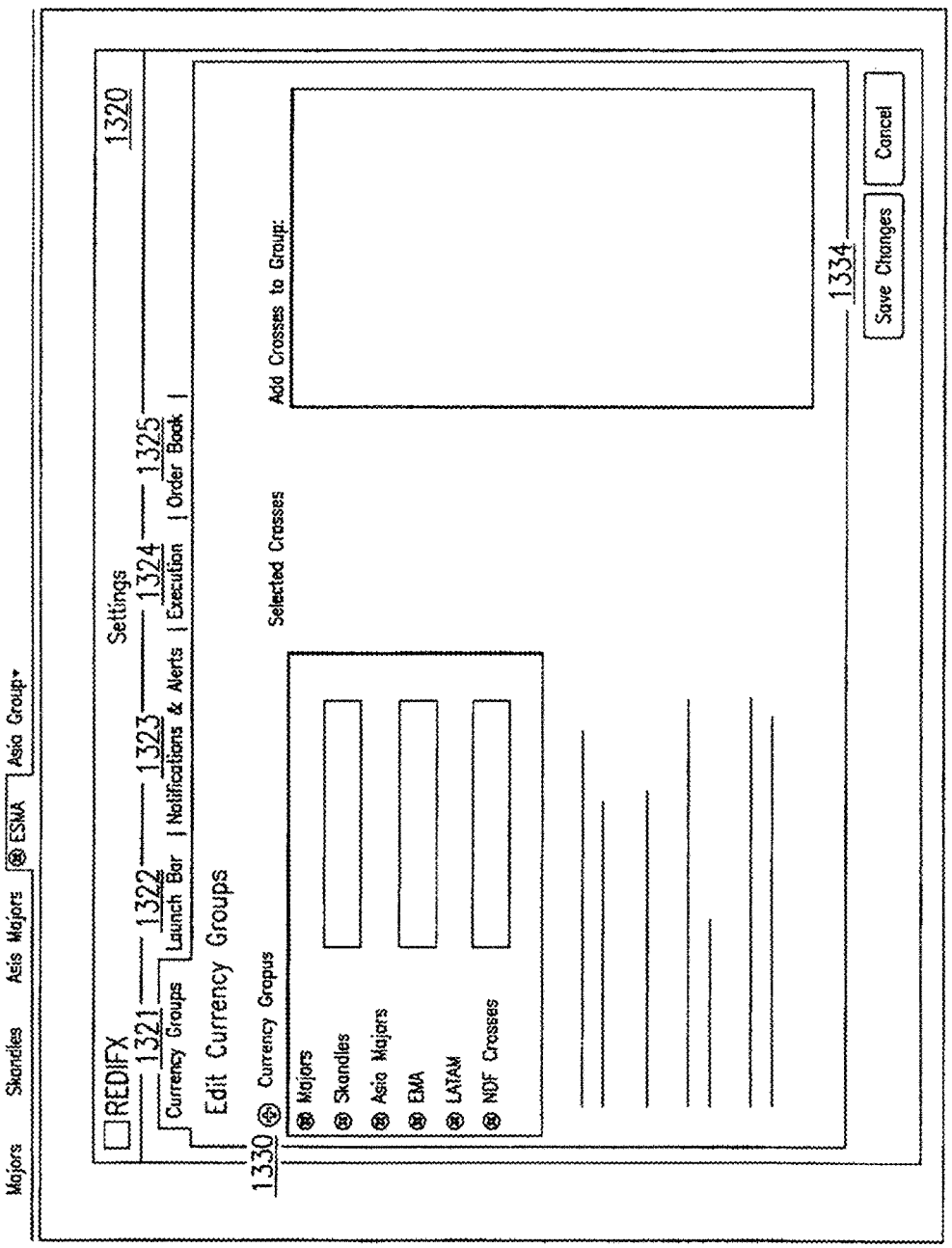
FIGS. 13a-13e are of screen image diagrams illustrating aspects of user environment preferences of one embodiment of APPARATUSES, METHODS AND SYSTEMS FOR A HIGH DENSITY FINANCIAL ASSET INFORMATION DISPLAY.

FIGS. 13a-13e are of screen image diagrams illustrating aspects of user environment preferences of one embodiment of the HD-FAID. FIG. 13a shows that the Settings display window 1320 has five tabs: a Currency Groups tab 1321, a Launch Bar tab 1322, a Notification & Alerts tab 1323, an Execution tab 1324, and an OrderBook tab 1325. When the Currency Groups tab 1321 is selected, a user may add a new group by clicking on the green "+" icon 1330. Further, a user may remove a group or currency pair by clicking on the "x" icon beside the row where the item resides, and save the changes made by clicking on button 1334.

Figure 13B:
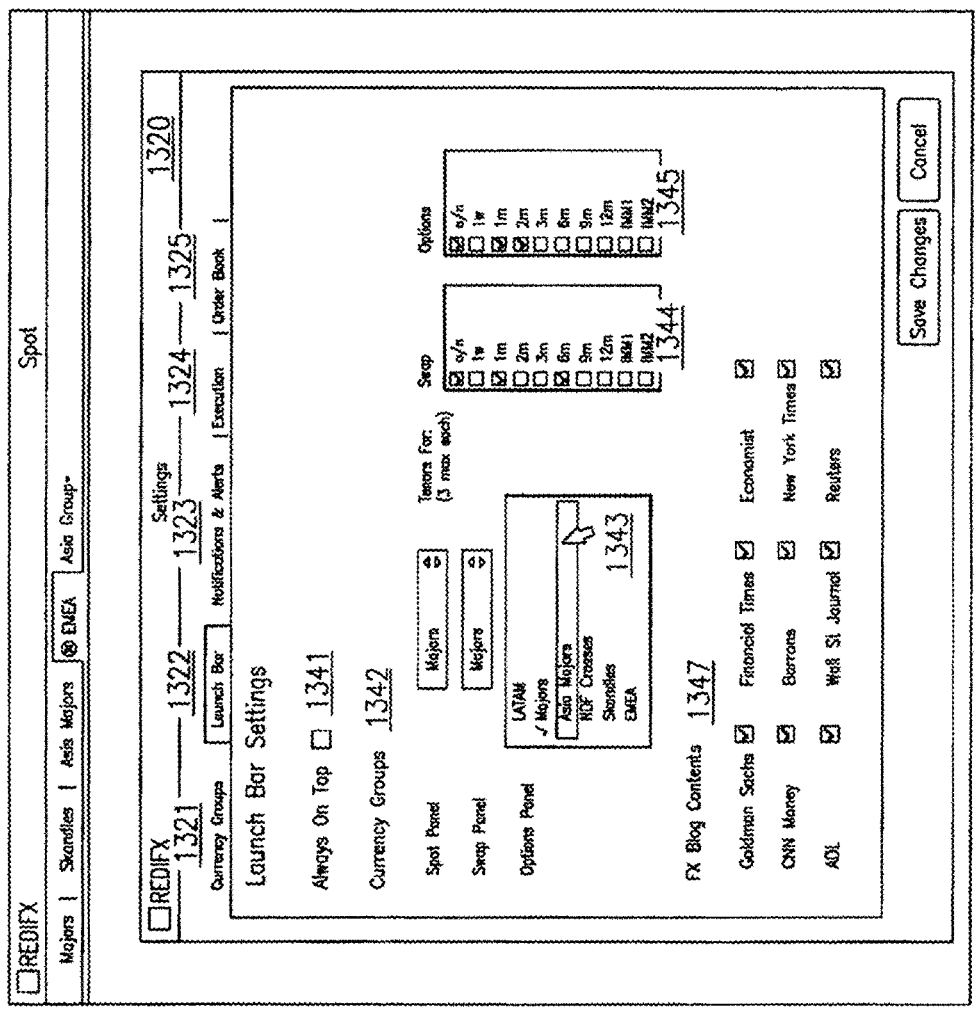

In one embodiment, FIG. 13b displays the settings associated with the selection of the Launch Bar tab 1322. A user may select the Launch Bar 1122 to always be on top by checking the appropriate box 1341. Further, a user may select 1347 the contents to view on his FX Blog 1128 by checking the appropriate boxes of the news sources. A user may also select the types of swaps 1344 and options 1345 that will be available on his HD-FAID for his selection(s) 1343 of currency groups.

Figure 13C:
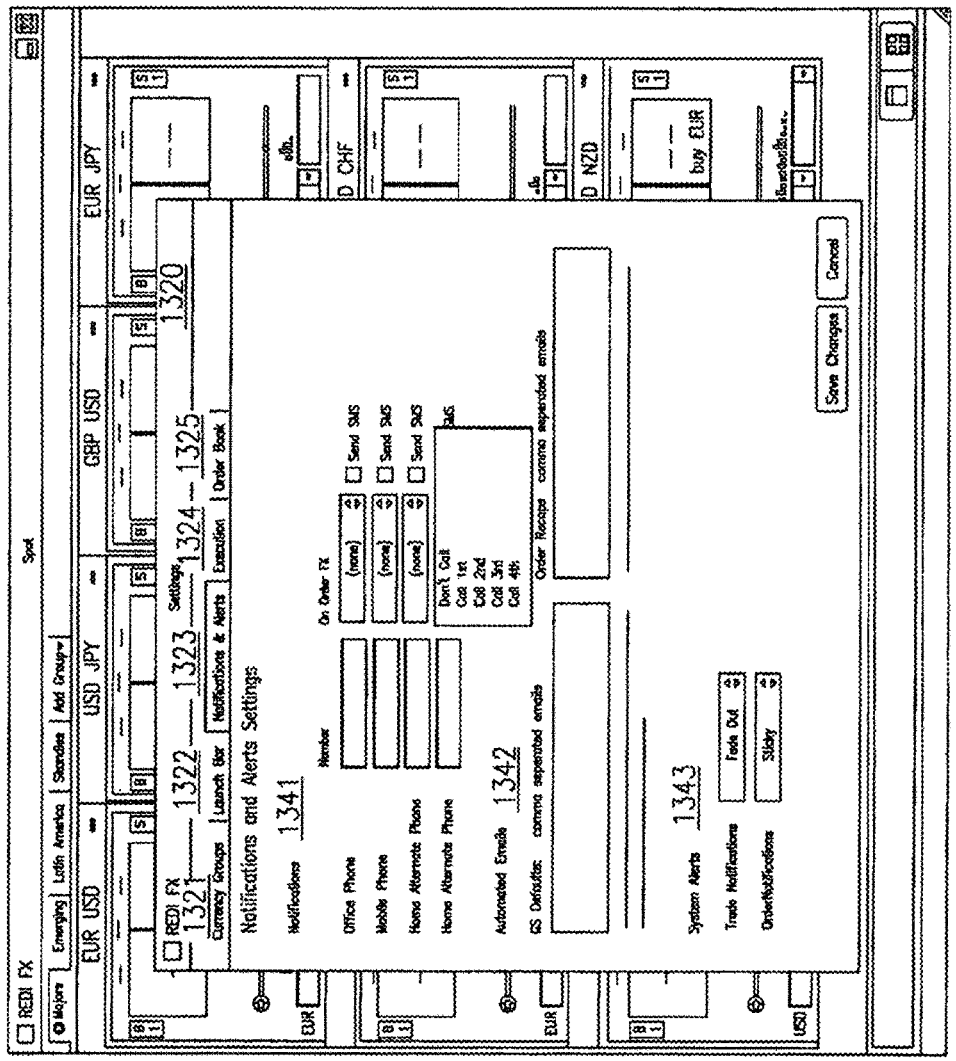
Figure 13D:
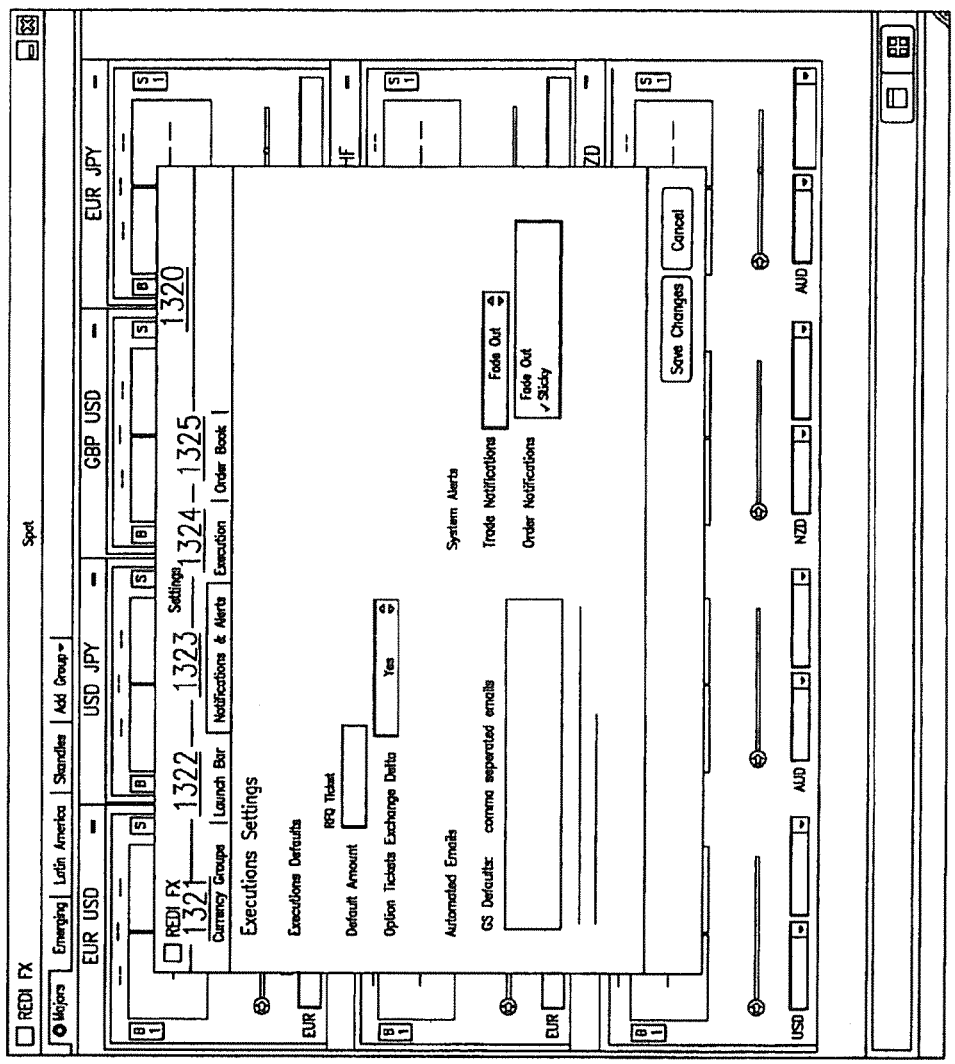
Figure 13E:
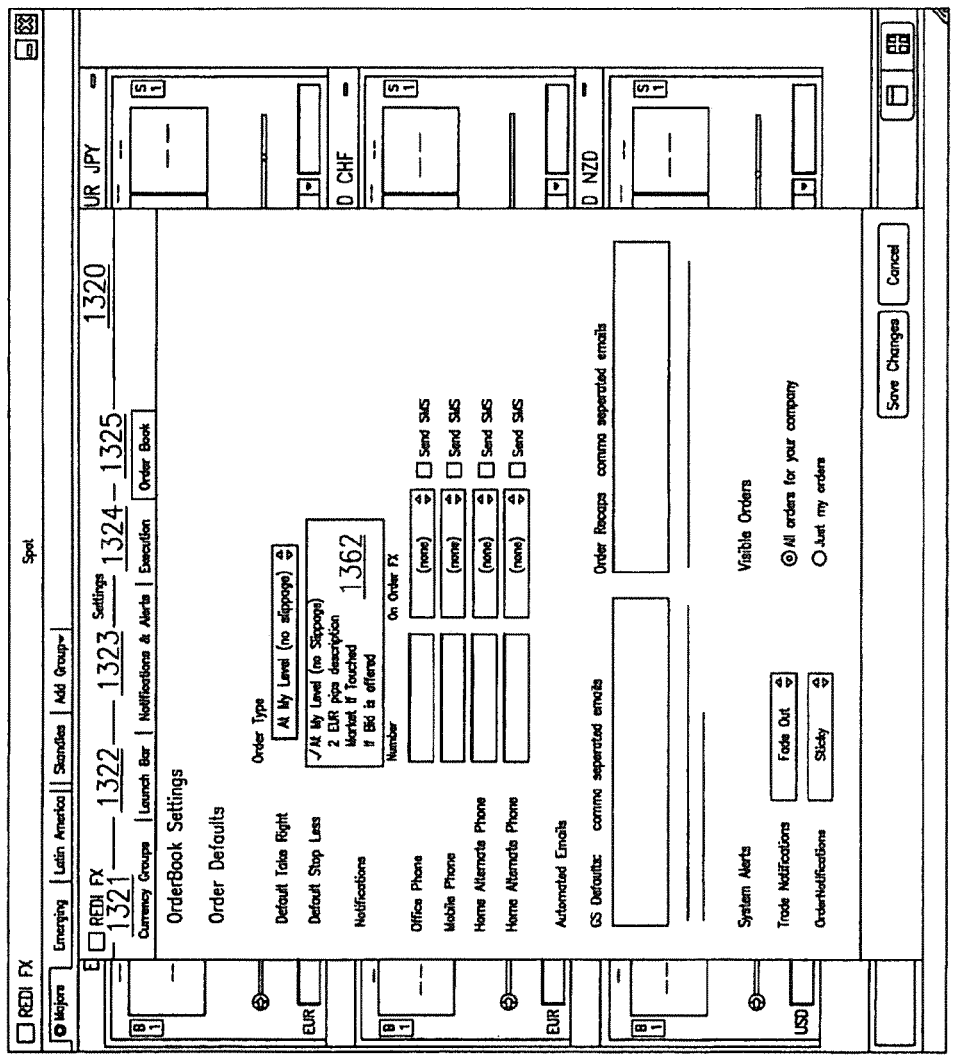

In one embodiment, FIG. 13c displays the settings associated with the selection of the Notification & Alerts tab 1323 of one embodiment of the HD-FAID. A user may provide his office phone number, mobile phone number, and/or other home alternate phone number in order to receive trade and order notifications. Automated emails 1342 may also be used to inform a user of his executed trades and order recap. Finally, a user may use 1343 to configure whether the system alerts received for his trade and order notifications would be sticky or fade out after a specified time. In another embodiment, FIG. 13d displays the settings associated with the selection of the Execution tab 1323, and FIG. 13e displays the setting associated with the selection of the OrderBook tab. Some of the selection options of FIG. 13c described in this paragraph are also available in the displays of FIGS. 13d and 13e. Additional selections may include the order defaults 1362 that can be used to specify default take profit and stop loss order types, such as "At My Level (no slippage)" and "Market if Touched".

Figure 14Q:
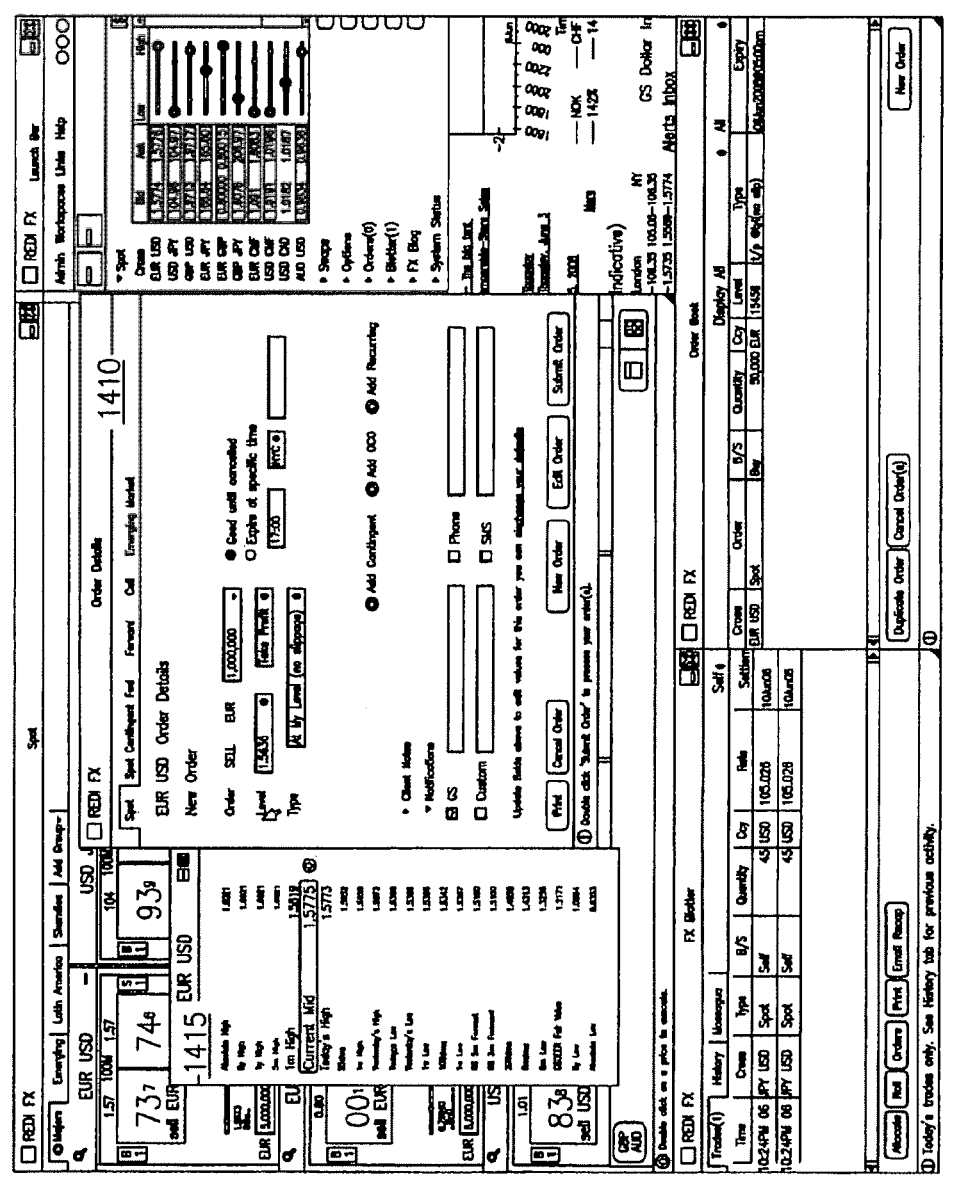
Figure 14B:
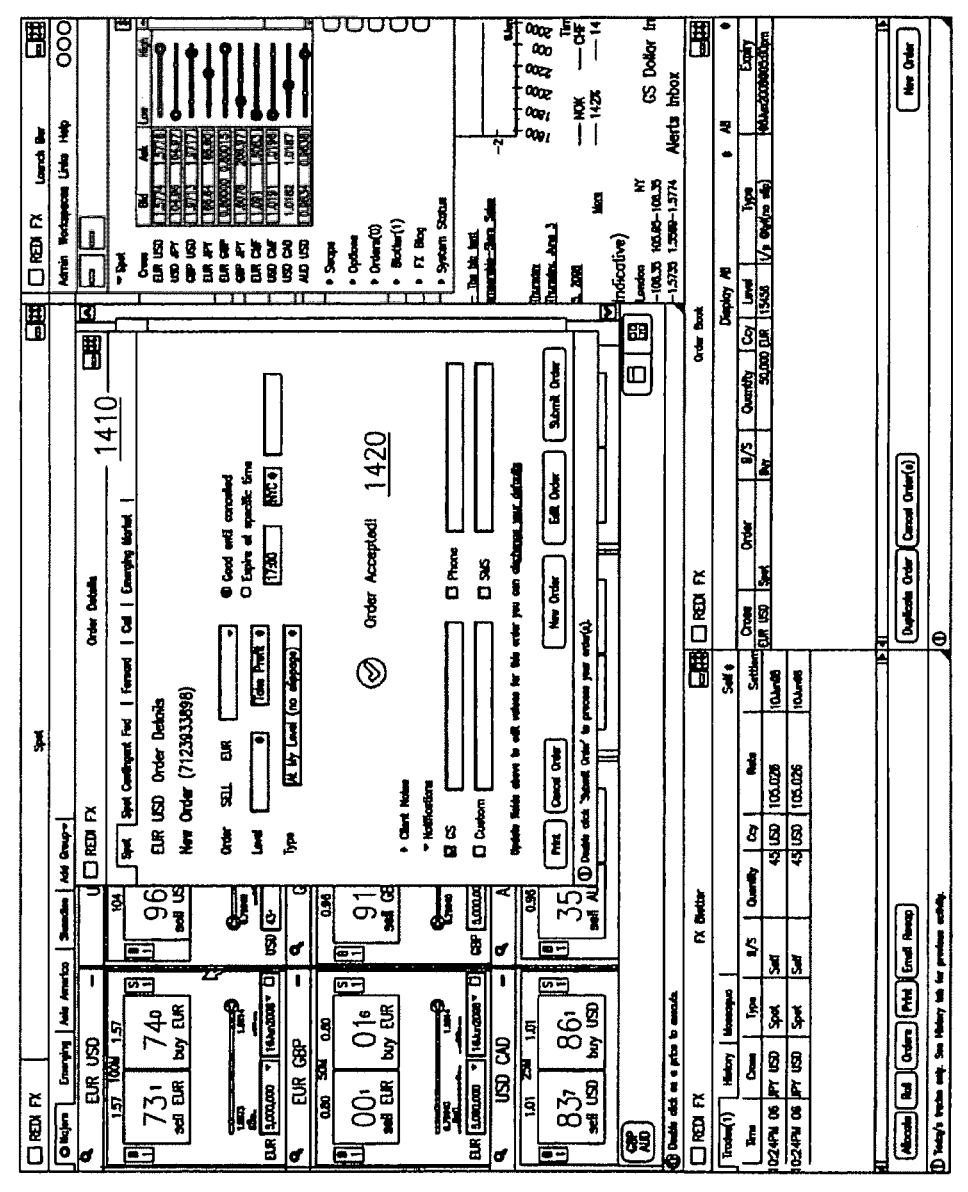
Figure 14C:
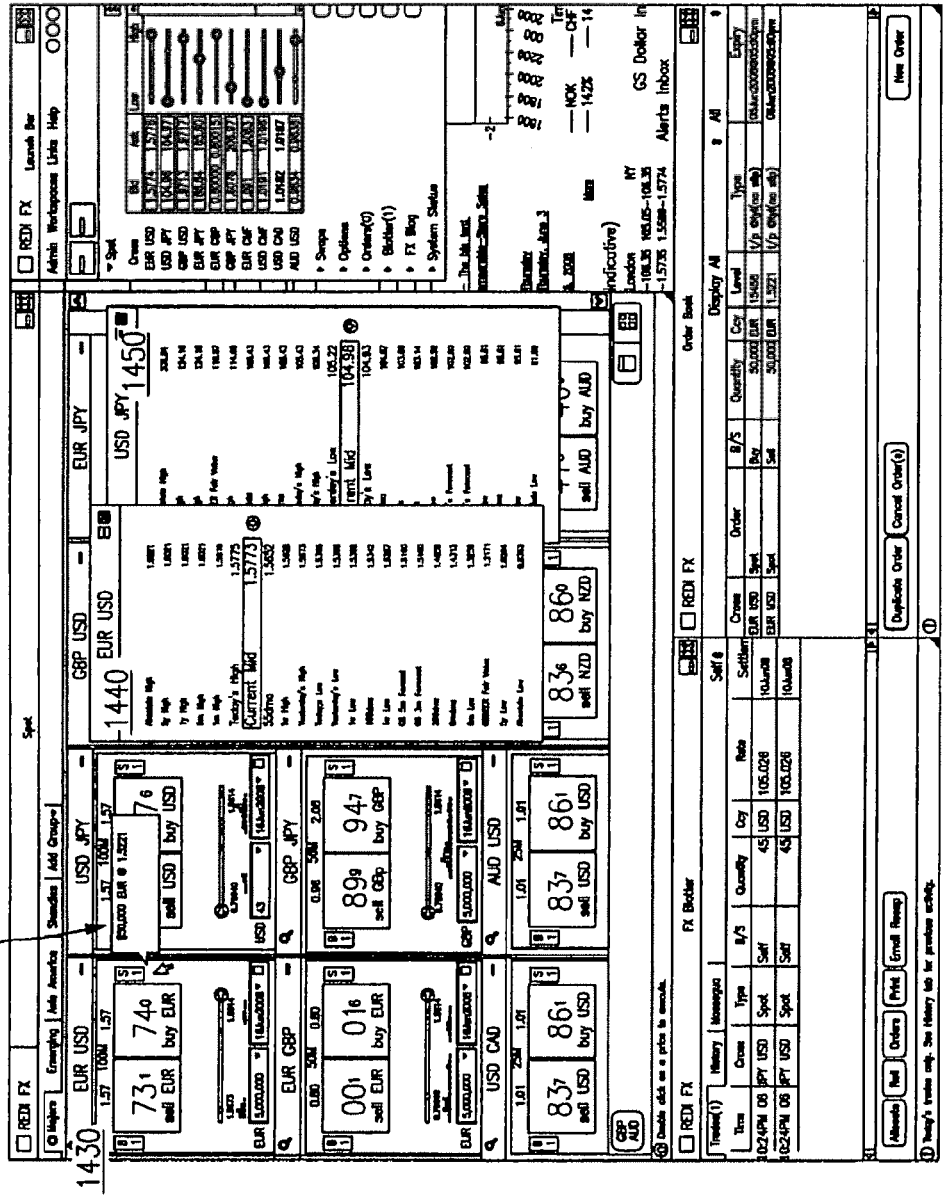
Figure 14D:
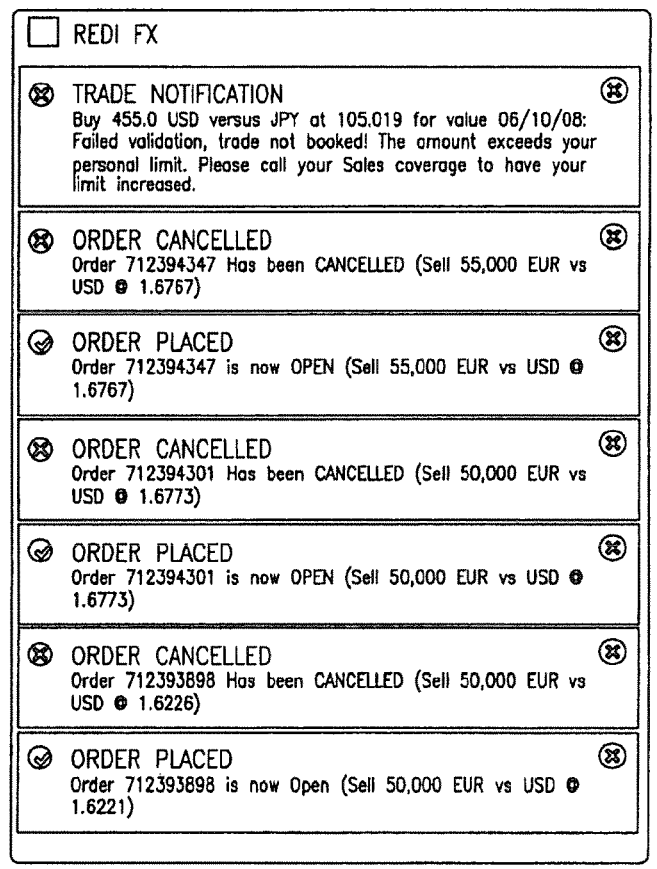

FIGS. 14a-14d are a sequence of screen image diagrams illustrating aspects of placing currency orders for one embodiment of the HD-FAID. FIG. 14a provides an example of a user interface that may be employed in order to enter an order for a EUR/USD currency pair. A user may look at the information provided in the key level selector display 1415 before deciding what order to place on the EUR/USD pair by using the "Order details" display 1410. For example, a user may decide to enter a sell order for 50,000 EUR vs. USD at a price of 1.6221. If the amount does not exceed the personal limit of the user, the HD-FAID will accept the sell order and display a notification 1420 on the "Order Details display 1410, as shown in FIG. 14b. FIG. 14c is of a further embodiment of the HD-FAID that may display the user entered trades for each currency pair under the corresponding sell or buy buttons of the currency pair tile. For example, as displayed in FIG. 14d, a user may click on the number "21" under the sell button of the EUR/USD tile 1430 in order to see the details of the entered trade 1435, e.g., sell 50,000 EUR vs. USD at 1.6221. In one implementation, all the HD-FAID currency pair trade notifications may be viewed in a display window such as that of FIG. 14d that may be placed in the corner of the HD-FAID display. The trade notification window may provide information about entered and canceled trades, executed trades, and trade notifications about unacceptable orders. In one implementation, the currency pair trade notification display may pop up on the HD-FAID every time a new event occurs, and in another implementation the notification display may be displayed continuously in a corner of the HD-FAID display and new events would be displayed with a flashing color to alert the user.

Figure 15A:
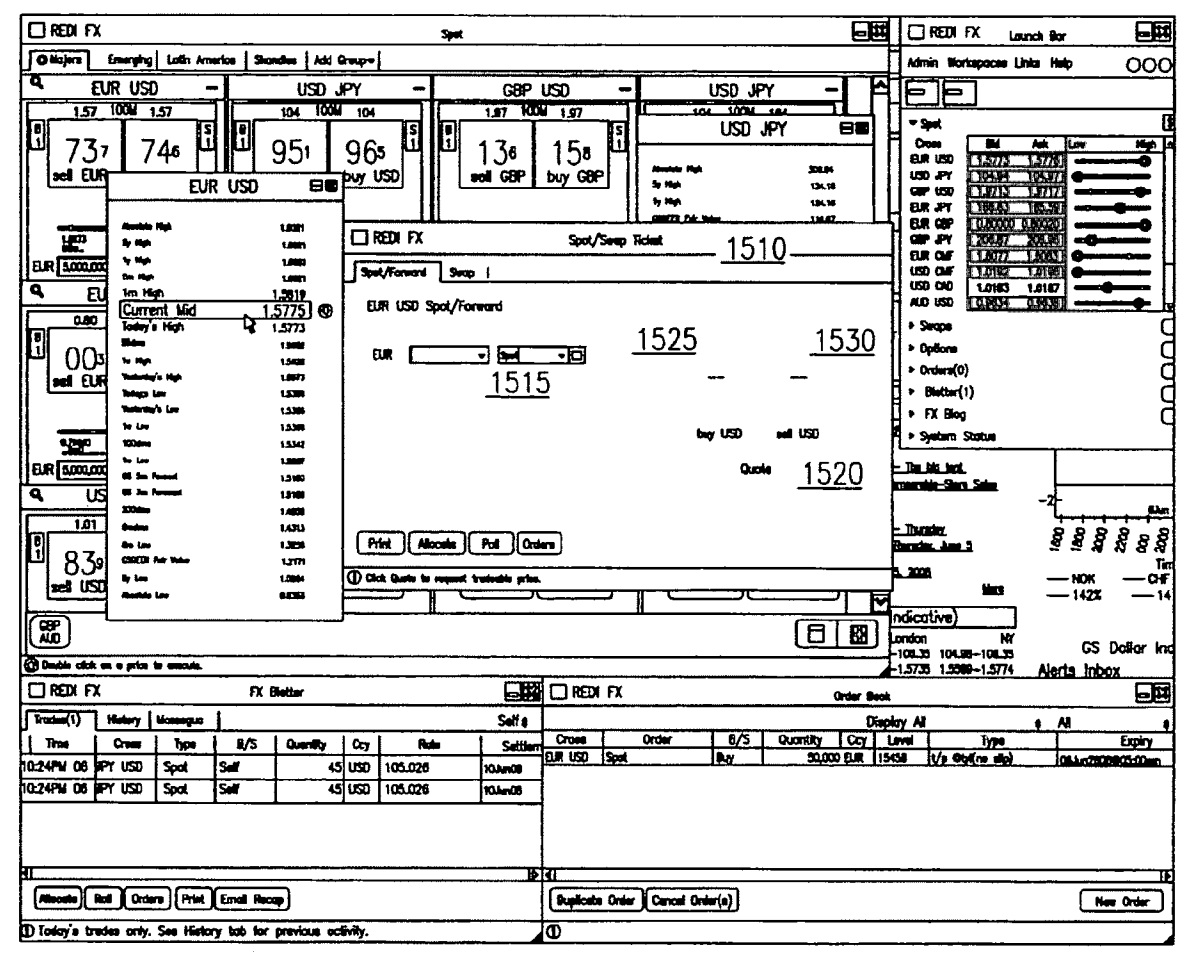
Figure 15B:
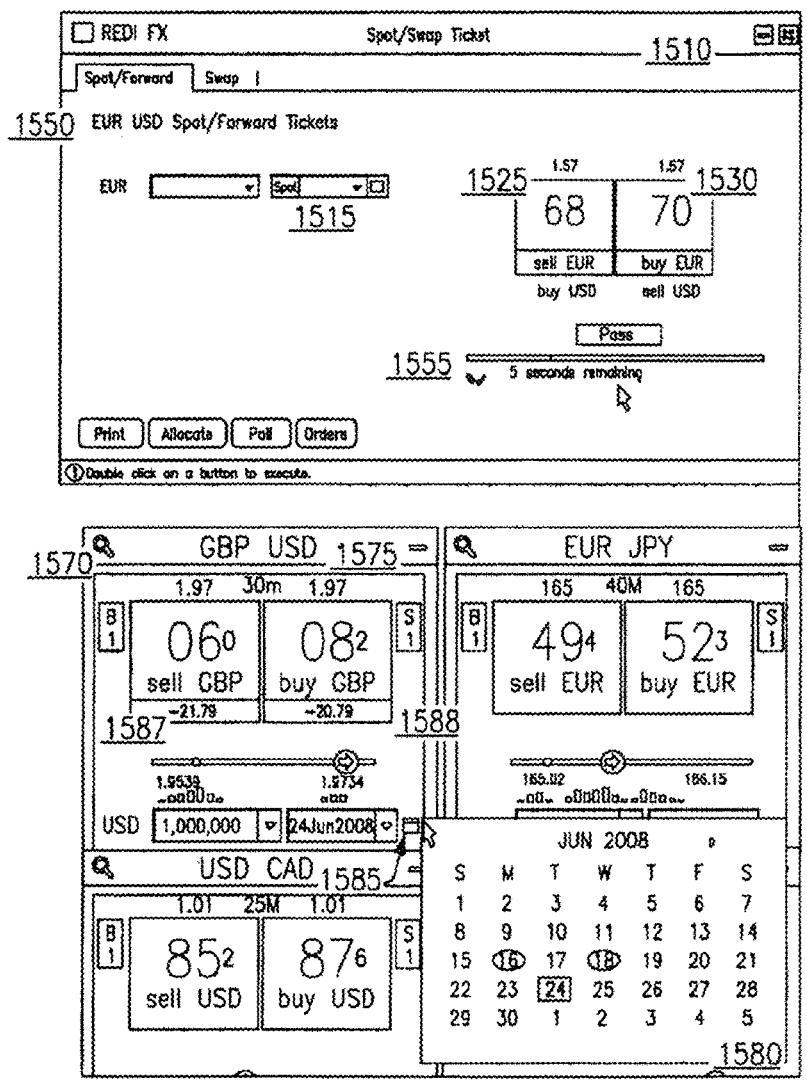

FIGS. 15a-15b are of screen image diagrams illustrating further aspects of one non-limiting embodiment of the HD-FAID. FIG. 15a shows a "Spot/Swap Ticket" window 1510 that may allow a user to select spot or forward rates 1515 for a currency pair by clicking on the quote button 1520. Once a spot/forward selection is made, the corresponding buy 1530 and sell 1525 prices for the selections will be displayed. For example, as shown in frame 1550 of FIG. 15b, if a user selects a forward date 1515 of Jun. 10, 2008 the HD-FAID would retrieve and display the forward buy 1530 and sell 1525 rates for EUR vs. USD. In our example, the forward buy rate for EUR vs. USD would be 1.5770 and the forward sell rate for EUR vs. USD would be 1.5768. If a user decides to execute a spot or forward trade, an indicator 1555 may be used by the HD-FAID to provide information about the remaining time until order execution, e.g. indicator showing 5 seconds remaining.

Frame 570 of FIG. 15b provides a further embodiment of the HD-FAID that may be employed by a user to enter forward trades in the grid view display environment. For example, a user may decide to enter a forward trade for the GBP/USD currency pair displayed in tile 1575. The user may enter the date of interest for the forward trade for the GBP/USD pair by using calendar pop-up display 1580 that may be invoked by clicking calendar button 1585. In one implementation, the relative difference between current and forward rates may be displayed 1587 and 1588 under the current buy and sell prices for the currency pair.

HD-FAID Controller

Figure 16:
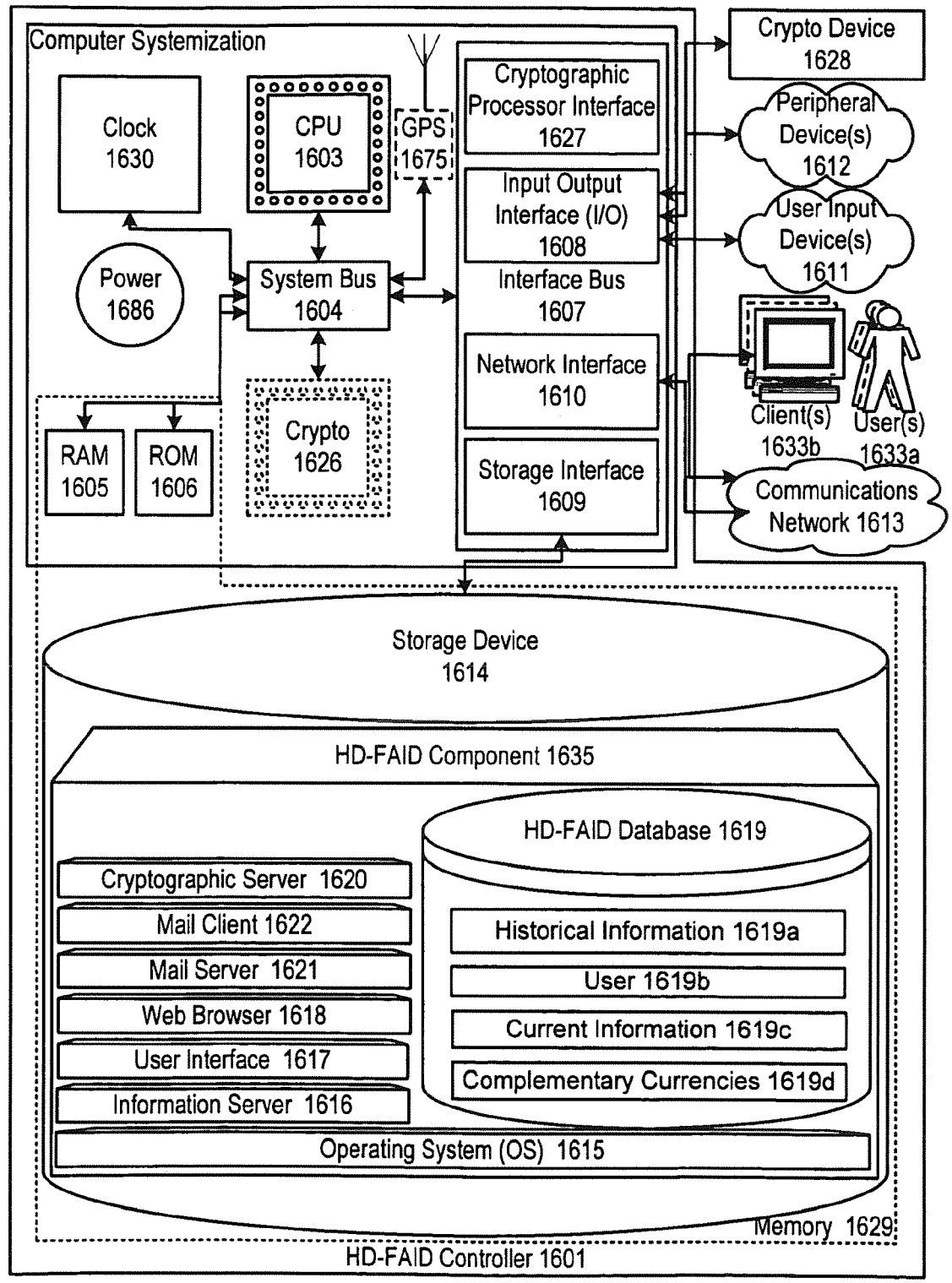
FIG. 16 is of a block diagram illustrating one non-limiting example embodiment of a high density financial asset information display controller.

FIG. 16 of the present disclosure illustrates inventive aspects of a HD-FAID controller 1601 in a block diagram. In this embodiment, the HD-FAID controller 1601 may serve to aggregate, process, store, search, serve, identify, instruct, generate, match, and/or facilitate interactions with a computer through various display and interface technologies, and/or other related data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the HD-FAID controller 1601 may be connected to and/or communicate with entities such as, but not limited to: one or more users from user input devices 1611; peripheral devices 1612; a cryptographic processor device 1628; and/or a communications network 1613.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico Networks, Wide Area Networks (WANs), Wireless Networks (WLANs), etc. For example, the Internet is generally accepted as being an interconnection of a multitude of networks whereby remote clients and servers may access and interoperate with one another.

The HD-FAID controller 1601 may be based on common computer systems that may comprise, but are not limited to, components such as: a computer systemization 1602 connected to memory 1629.

Computer Systemization

A computer systemization 1602 may comprise a clock 1630, central processing unit (CPU) 1603, a read only memory (ROM) 1606, a random access memory (RAM) 1605, and/or an interface bus 1607, and most frequently, although not necessarily, are all interconnected and/or communicating through a system bus 1604. Optionally, the computer systemization may be connected to an internal power source 1686. Optionally, a cryptographic processor 1626 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the HD-FAID controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 1686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1686 is connected to at least one of the interconnected subsequent components of the HD-FAID thereby providing an electric current to all subsequent components. In one example, the power source 1686 is connected to the system bus component 1604. In an alternative embodiment, an outside power source 1686 is provided through a connection across the I/O 1608 interface. For example, a USB and/or IEEE 1394 connection carries both data and power across the connection and is therefore a suitable source of power.

Interface Adapters

Interface bus(ses) 1607 may accept, connect, and/or communicate to a number of interface adapters, conventionally although not necessarily in the form of adapter cards, such as but not limited to: input output interfaces (I/O) 1608, storage interfaces 1609, network interfaces 1610, and/or the like. Optionally, cryptographic processor interfaces 1627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1609 may accept, communicate, and/or connect to a number of storage devices such as, but not limited to: storage devices 1614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1610 may accept, communicate, and/or connect to a communications network 1613. Through a communications network 713, the HD-FAID controller is accessible through remote clients 1633b (e.g., computers with web browsers) by users 1633a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1610 may be used to engage with various communications network types 1613. For example, multiple network interfaces may be employed to allow for the communication over broadcast, multicast, and/or unicast networks.

Input Output interfaces (I/O) 1608 may accept, communicate, and/or connect to user input devices 1611, peripheral devices 1612, cryptographic processor devices 1628, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 1611 may be card readers, dongles, finger print readers, gloves, graphics tablets, joysticks, keyboards, mouse (mice), remote controls, retina readers, trackballs, trackpads, and/or the like.

Peripheral devices 1612 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the HD-FAID controller may be embodied as an embedded, dedicated, and/or monitor-less (i.e., headless) device, wherein access would be provided over a network interface connection.

Cryptographic units such as, but not limited to, microcontrollers, processors 1626, interfaces 1627, and/or devices 1628 may be attached, and/or communicate with the HD-FAID controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 1629. However, memory is a fungible technology and resource, thus, any number of memory embodiments may be employed in lieu of or in concert with one another. It is to be understood that the HD-FAID controller and/or a computer systemization may employ various forms of memory 1629. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1629 will include ROM 1606, RAM 1605, and a storage device 1614. A storage device 1614 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 1629 may contain a collection of program and/or database components and/or data such as, but not limited to: operating system component(s) 1615 (operating system); information server component(s) 1616 (information server); user interface component(s) 1617 (user interface); Web browser component(s) 1618 (Web browser); database(s) 1619; mail server component(s) 1621; mail client component(s) 1622; cryptographic server component(s) 1620 (cryptographic server); the HD-FAID component(s) 1635; and/or the like (i.e., collectively a component collection). These components may be stored and accessed from the storage devices and/or from storage devices accessible through an interface bus. Although non-conventional program components such as those in the component collection, typically, are stored in a local storage device 1614, they may also be loaded and/or stored in memory such as: peripheral devices, RAM, remote storage facilities through a communications network, ROM, various forms of memory, and/or the like.

Operating System

The operating system component 1615 is an executable program component facilitating the operation of the HD-FAID controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NTNista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the HD-FAID controller to communicate with other entities through a communications network 1613. Various communication protocols may be used by the HD-FAID controller as a subcarrier transport mechanism for interaction, such as, but not limited to: multicast, TCP/IP, UDP, unicast, and/or the like.

Information Server

An information server component 1616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, Java, JavaScript, Practical Extraction Report Language (PERL), Hypertext Pre-Processor (PHP), pipes, Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the HD-FAID controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the HD-FAID database 1619, operating systems, other program components, user interfaces, Web browsers, and/or the like.

Access to the HD-FAID database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the HD-FAID. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the HD-FAID as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/Vista (i.e., Aero)/XP, or Unix's X-Windows (e.g., which may include additional Unix graphic interface libraries and layers such as K Desktop Environment (KDE), mythTV and GNU Network Object Model Environment (GNOME)), provide a baseline and means of accessing and displaying information graphically to users.

A user interface component 1617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1618 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the HD-FAID enabled nodes. The combined application may be nugatory on systems employing standard Web browsers.

Mail Server

A mail server component 1621 is a stored program component that is executed by a CPU 1603. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the HD-FAID.

Access to the HD-FAID mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1622 is a stored program component that is executed by a CPU 1603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1620 is a stored program component that is executed by a CPU 1603, cryptographic processor 1626, cryptographic processor interface 1627, cryptographic processor device 1628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the HD-FAID may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the HD-FAID component to engage in secure transactions if so desired. The cryptographic component facilitates the secure accessing of resources on the HD-FAID and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The HD-FAID Database

The HD-FAID database component 1619 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the HD-FAID database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the HD-FAID database is implemented as a data-structure, the use of the HD-FAID database 1619 may be integrated into another component such as the HD-FAID component 1635. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1619 includes several tables 1619*a-d*. A historical information table 1619*a* includes fields such as, but not limited to: an Asset_ID, a Data source ID, historical open and close prices, volume traded, historical analyses, and/or the like. A user table 1619*b* may include fields such as, but not limited to: User_ID, workspace ID, account type, account preferences, tracked assets, and/or the like. A current information table 1619*c* includes fields such as, but not limited to: Asset_ID, current price, current volume, current direction, up-to-date analyses, and/or the like. Finally, a complementary currencies table 1619*d* includes fields such as, but not limited to: available currency pairs, Asset_IDs, asset_ID links, and/or the like.

In one embodiment, the HD-FAID database may interact with other database systems. For example, employing a distributed database system, queries and data access by search navigator component may treat the combination of the HD-FAID database, an integrated data security layer database as a single database entity.

In one embodiment, user programs may contain various user interface primitives, which may serve to update the HD-FAID. Also, various accounts may require custom database tables depending upon the environments and the types of clients the HD-FAID may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1619*a-e*. The HD-FAID may be configured to keep track of various settings, inputs, and parameters via database controllers.

The HD-FAID database may communicate to and/or with other components in a component collection, including itself, and/or facilities of the like. Most frequently, the HD-FAID database communicates with the HD-FAID component, other program components, and/or the like. The database may contain, retain, and provide information regarding other nodes and data.

The HD-FAIDs

The HD-FAIR component 1635 is a stored program component that is executed by a CPU. In one embodiment, the HD-FAID component incorporates any and/or all combinations of the aspects of the HD-FAID that was discussed in the previous figures. As such, the HD-FAID affects accessing, obtaining and the provision of information, services, transactions, and/or the like across various communications networks.

The HD-FAID component enables the retrieval, monitoring, analysis, output of dense data streams and/or the like.

The HD-FAID component enabling access of information between nodes may be developed by employing standard development tools and languages such as, but not limited to: Apache components, Assembly, ActiveX, binary executables, (ANSI) (Objective) C (++), C# and/or .NET, database adapters, CGI scripts, Java, JavaScript, mapping tools, procedural and object oriented development tools, PERL, PHP, Python, shell scripts, SQL commands, web application server extensions, WebObjects, and/or the like. In one embodiment, the HD-FAID server employs a cryptographic server to encrypt and decrypt communications. The HD-FAID component may communicate to and/or with other components in a component collection, including itself, and/or facilities of the like. Most frequently, the HD-FAID component communicates with the HD-FAID database, operating systems, other program components, and/or the like. The HD-FAID may contain, communicate, generate, obtain, and/or provide program component, system, user, and/or data communications, requests, and/or responses.

Distributed HD-FAIDs

The structure and/or operation of any of the HD-FAID node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the HD-FAID controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A non-transitory computer readable medium encoded with instructions that, when executed by at least one processor, cause the at least one processor to provide:
    a first asset selection interface element configured to provide selection of an initial financial asset class;
    a second asset selection interface element configured to provide a set of financial asset selections complementary to the first asset selection interface element, whereby the set of financial asset selections are determined by checking a list of asset pairs available to a user;
    a display area configured to show, for an asset pair, asset pair information based on one or more user inputs made to the first and second asset selection interface elements, wherein the asset pair information comprises:
        an opening price of the asset pair for a day;
        a current price of the asset pair;
        a high price of the asset pair for the day;
        a low price of the asset pair for the day;
        a price range of the asset pair for the day, wherein the price range of the asset pair for the day is a range between the low price of the asset pair for the day and the high price of the asset pair for the day;
        a high price of the asset pair for a past ten minutes;
        a low price of the asset pair for the past ten minutes; and
        a price range of the asset pair for the past ten minutes, wherein the price range of the asset pair for the past ten minutes is a range between the low price of the asset pair for the past ten minutes and the high price of the asset pair for the past ten minutes;
    an asset pair current buy and sell price indicator element responsive to the asset pair information;
    an asset pair sparkline velocity indicator element responsive to the asset pair information, the asset pair sparkline velocity indicator element configured to pulse to indicate a sudden spike in the current price of the asset pair;
        wherein the asset pair sparkline velocity indicator element has an intensity trail, wherein the intensity trail includes a place for the asset pair sparkline velocity indicator element in a position corresponding to the current price of the asset pair, a region allowing the asset pair sparkline velocity indicator element to move within the price range of the asset pair for the day, a region indicating the price range of the asset pair for the past ten minutes lower than the current price with one color, and another region indicating the price range of the asset pair for the past ten minutes higher than the current price with a different color, and
        wherein the asset pair sparkline velocity indicator element has a directionality, wherein the directionality is determined by using a median price of the asset pair for the day and an exponential moving average of the current price of the asset pair over the past ten minutes;
    an asset pair trade selection interface element configured to receive a user input to effect a trade on the asset pair;
    a time histogram indicator element configured to indicate an amount of time the asset pair is traded at each price; and
    a daily price change indicator element configured to provide a percentage change of the price of the asset pair on the day, wherein the percentage change of the price of the asset pair on the day is determined by subtracting the opening price from the current price of the asset pair and then dividing by the opening price of the asset pair, the daily price change indicator element displayed as a title bar that is colored according to the percentage change of the price of the asset pair on the day.

2. The non-transitory computer readable medium of claim 1, wherein the first and second asset selection interface elements are further configured to be engaged more than once to provide selection for multiple selected asset pairs among the asset pairs available to the user.

3. The non-transitory computer readable medium of claim 2, wherein the instructions when executed further cause the at least one processor to provide:
a group creation interface element configured to create groups that are comprised of subsets of the selected asset pairs.

4. The non-transitory computer readable medium of claim 2, wherein the instructions when executed further cause the at least one processor to provide:
a display view selection interface element configured to select a first subset of the selected asset pairs to be presented on the display area using a grid format and a second subset of the selected asset pairs to be presented on the display area using a list format.

5. The non-transitory computer readable medium of claim 1, wherein the instructions when executed further cause the at least one processor to provide:
a key level selector indicator element configured to provide key price levels for the asset pair including high and low price levels for different time periods, various day-moving-averages, and asset pair price forecasts.

6. A non-transitory computer readable medium encoded with instructions that, when executed by at least one processor, cause the at least one processor to provide:
a first asset selection interface element configured to provide selection of an initial financial asset class;
a second asset selection interface element configured to provide a set of financial asset selections complementary to the first asset selection interface element, whereby the set of financial asset selections are determined by checking a list of asset pairs available to a user;
a display area configured to show, for an asset pair, asset pair information based on one or more user inputs made to the first and second asset selection interface elements, wherein the asset pair information comprises:
an opening price of the asset pair for a deployment relevant time span;
a current price of the asset pair;
a high price of the asset pair for the deployment relevant time span;
a low price of the asset pair for the deployment relevant time span;
a price range of the asset pair for the deployment relevant time span, wherein the price range of the asset pair for the deployment relevant time span is a range between the low price of the asset pair for the deployment relevant time span and the high price of the asset pair for the deployment relevant time span;
a high price of the asset pair for a secondary relevant time span;
a low price of the asset pair for the secondary relevant time span; and
a price range of the asset pair for the secondary relevant time span, wherein the price range of the asset pair for the secondary relevant time span is a range between the low price of the asset pair for the secondary relevant time span and the high price of the asset pair for the secondary relevant time span;
an asset pair current buy and sell price indicator element responsive to the asset pair information; and
an asset pair sparkline velocity indicator element responsive to the asset pair information,
wherein the asset pair sparkline velocity indicator element has an intensity trail, wherein the intensity trail includes a place for the asset pair sparkline velocity indicator element in a position corresponding to the current price of the asset pair, a region allowing the asset pair sparkline velocity indicator element to move within the price range of the asset pair for a last deployment relevant time span, a region indicating the price range of the asset pair for a last secondary relevant time span lower than the current price with one color, and another region indicating the price range of the asset pair for the last secondary relevant time span higher than the current price with a different color, and
wherein the asset pair sparkline velocity indicator element has a directionality, wherein the directionality is determined by using a median price of the asset pair over the last deployment relevant time span and an exponential moving average of the current price of the asset pair over the last secondary relevant time span.

7. The non-transitory computer readable medium of claim 6, wherein the instructions when executed further cause the at least one processor to provide:
an asset pair trade selection interface element configured to receive a user input to effect a trade on the asset pair.

8. The non-transitory computer readable medium of claim 6, wherein the asset pair sparkline velocity indicator element is further configured to start pulsing to indicate a spike in the current price of the asset pair.

9. The non-transitory computer readable medium of claim 6, wherein the instructions when executed further cause the at least one processor to provide:
a time histogram indicator element configured to indicate an amount of time the asset pair is traded at each price.

10. The non-transitory computer readable medium of claim 6, wherein the instructions when executed further cause the at least one processor to provide:
a price change indicator element for the deployment relevant time span, the price change indicator element configured to provide a percentage change of the current price of the asset pair on the deployment relevant time span, wherein the percentage change of the current price of the asset pair on the deployment relevant time span is determined by subtracting the opening price from the current price of the asset pair and then dividing by the opening price of the asset pair.

11. The non-transitory computer readable medium of claim 10, wherein the price change indicator element for the deployment relevant time span is displayed as a title bar that is colored according to the percentage change of the current price of the asset pair on the deployment relevant time span.

12. The non-transitory computer readable medium of claim 6, wherein the deployment relevant time span is one day.

13. The non-transitory computer readable medium of claim 6, wherein the secondary relevant time span is ten minutes.

14. The non-transitory computer readable medium of claim 6, wherein the first and second asset selection interface elements are further configured to be engaged more than once to provide selection for multiple selected asset pairs among the asset pairs available to the user.

15. The non-transitory computer readable medium of claim 14, wherein the instructions when executed further cause the at least one processor to provide:
a group creation interface element configured to create groups that are comprised of subsets of the selected asset pairs.

16. The non-transitory computer readable medium of claim 14, wherein the instructions when executed further cause the at least one processor to provide:
a display view selection interface element configured to select a first subset of the selected asset pairs to be presented on the display area using a grid format and a second subset of the selected asset pairs to be presented on the display area using a list format.

17. The non-transitory computer readable medium of claim 6, wherein the instructions when executed further cause the at least one processor to provide:
a key level selector indicator element configured to provide key price levels for the asset pair including high and low price levels for different time periods, various day-moving-averages, and asset pair price forecasts.

18. An apparatus comprising:
a memory configured to store instructions; and
at least one processor configured when executing the instructions to:
provide a first asset selection interface element configured to provide selection of an initial financial asset class;
provide a second asset selection interface element configured to provide a set of financial asset selections complementary to the first asset selection interface element, whereby the set of financial asset selections are determined by checking a list of asset pairs available to a user;
provide a display area configured to show, for an asset pair, asset pair information based on one or more user inputs made to the first and second asset selection interface elements, wherein the asset pair information comprises:
an opening price of the asset pair for a day;
a current price of the asset pair;
a high price of the asset pair for the day;
a low price of the asset pair for the day;
a price range of the asset pair for the day, wherein the price range of the asset pair for the day is a range between the low price of the asset pair for the day and the high price of the asset pair for the day;
a high price of the asset pair for a past ten minutes;
a low price of the asset pair for the past ten minutes; and
a price range of the asset pair for the past ten minutes, wherein the price range of the asset pair for the past ten minutes is a range between the low price of the asset pair for the past ten minutes and the high price of the asset pair for the past ten minutes;
provide an asset pair current buy and sell price indicator element responsive to the asset pair information;
provide an asset pair sparkline velocity indicator element responsive to the asset pair information, the asset pair sparkline velocity indicator element configured to pulse to indicate a sudden spike in the current price of the asset pair;
wherein the asset pair sparkline velocity indicator element has an intensity trail, wherein the intensity trail includes a place for the asset pair sparkline velocity indicator element in a position corresponding to the current price of the asset pair, a region allowing the asset pair sparkline velocity indicator element to move within the price range of the asset pair for the day, a region indicating the price range of the asset pair for the past ten minutes lower than the current price with one color, and another region indicating the price range of the asset pair for the past ten minutes higher than the current price with a different color, and
wherein the asset pair sparkline velocity indicator element has a directionality, wherein the directionality is determined by using a median price of the asset pair for the day and an exponential moving average of the current price of the asset pair over the past ten minutes;
provide an asset pair trade selection interface element provided to receive a user input to effect a trade on the asset pair;
provide a time histogram indicator element configured to indicate an amount of time the asset pair is traded at each price; and
provide a daily price change indicator element configured to provide a percentage change of the price of the asset pair on the day, wherein the percentage change of the price of the asset pair on the day is determined by subtracting the opening price from the current price of the asset pair and then dividing by the opening price of the asset pair, the daily price change indicator element displayed as a title bar that is colored according to the percentage change of the price of the asset pair on the day.

19. The apparatus of claim 18, wherein the first and second asset selection interface elements are further configured to be engaged more than once to provide selection for multiple selected asset pairs among the asset pairs available to the user.

20. The apparatus of claim 19, wherein the at least one processor is further configured when executing the instructions to provide a group creation interface element configured to create groups that are comprised of subsets of the selected asset pairs.

* * * * *